US010673601B2

(12) United States Patent
Chen et al.

(10) Patent No.: US 10,673,601 B2
(45) Date of Patent: Jun. 2, 2020

(54) TECHNIQUES AND APPARATUSES FOR BANDWIDTH PART MANAGEMENT

(71) Applicant: QUALCOMM Incorporated, San Diego, CA (US)

(72) Inventors: Wanshi Chen, San Diego, CA (US); Heechoon Lee, San Diego, CA (US); Peter Gaal, San Diego, CA (US); Juan Montojo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/042,581

(22) Filed: Jul. 23, 2018

(65) Prior Publication Data

US 2019/0036673 A1 Jan. 31, 2019

Related U.S. Application Data

(60) Provisional application No. 62/537,802, filed on Jul. 27, 2017.

(51) Int. Cl.
*H04L 5/00* (2006.01)
*H04L 1/16* (2006.01)
(Continued)

(52) U.S. Cl.
CPC .......... *H04L 5/0098* (2013.01); *H04L 1/1657* (2013.01); *H04L 1/1812* (2013.01);
(Continued)

(58) Field of Classification Search
CPC ..... H04L 5/0098; H04L 5/0064; H04L 5/001; H04W 28/20
See application file for complete search history.

(56) References Cited

U.S. PATENT DOCUMENTS

| | | | |
|---|---|---|---|
| 2013/0051342 A1* | 2/2013 | Aiba | H04L 1/1893 370/329 |
| 2018/0097679 A1* | 4/2018 | Zhang | H04L 27/2607 |
| 2018/0183551 A1* | 6/2018 | Chou | H04L 5/0042 |

OTHER PUBLICATIONS

Guangdong Oppo Mobile Telecom: "Bandwidth Part Based Resource Scheduling for Carrier Aggregation" 3GPP Draft, R1-1710171, 3rd Generation Partnership Project (3GPP) Mobile Competence Centre, 650 Route Des Lucioles, F-06921 Sophia-Antipolis Cedex, France vol. RAN WG1 No. Qingdao, P.R. China, Jun. 26-30, 2017, Jun. 26, 2017 (Jun. 26, 2017), XP051299395, pp. 1-3, Retrieved from the Internet: URL:http://www.3gpp.org/ftp/Meetings_3GPP_SYNC/RAN1/Docs/ [retrieved on Jun. 26, 2017].
(Continued)

*Primary Examiner* — Mohammad S Anwar
(74) *Attorney, Agent, or Firm* — Harrity & Harrity, LLP

(57) ABSTRACT

Certain aspects of the present disclosure generally relate to wireless communication. In some aspects, a user equipment (UE) may determine a limit on a number of concurrently active bandwidth parts, wherein the limit applies per component carrier used by the UE or across component carriers used by the UE. The UE may communicate using one or more bandwidth parts on one or more component carriers used by the UE based at least in part on the limit, wherein at least one bandwidth part of the one or more bandwidth parts is less than a full bandwidth that the UE is capable of using. Numerous other aspects are provided.

50 Claims, 14 Drawing Sheets

(51) Int. Cl.
   *H04L 1/18* (2006.01)
   *H04W 8/22* (2009.01)
   *H04W 28/20* (2009.01)
   *H04W 72/04* (2009.01)

(52) U.S. Cl.
   CPC ............ *H04L 5/001* (2013.01); *H04L 5/0064* (2013.01); *H04W 8/22* (2013.01); *H04W 28/20* (2013.01); *H04W 72/0446* (2013.01); *H04W 72/0453* (2013.01)

(56) References Cited

OTHER PUBLICATIONS

Guangdong Oppo Mobile Telecom: "Bandwidth Part Configuration and Frequency Resource Allocation", 3GPP Draft, R1-1710164, 3rd Generation Partnership Project (3GPP), Mobile Competence Centre, 650, Route Des Lucioles, F-06921 Sophia-Antipolis Cedex, France vol. RAN WG1, No. Qingdao, P.R. China; Jun. 27-30, 2017, Jun. 26, 2017 (Jun. 26, 2017), XP051299388, pp. 1-6, Retrieved from the Internet: URL:http://www.3gpp.org/ftp/Meetings_3GPP_SYNC/RAN1/Docs/ [retrieved on Jun. 26, 2017].

Intel Corporation: "Bandwidth Parts Configuration and Operations", 3GPP Draft, R1-1707420, 3rd Generation Partnership Project (3GPP), Mobile Competence Centre, 650, Route Des Lucioles, F-06921 Sophia-Antipolis Cedex, France vol. RAN WG1, No. Hangzhou, China, May 15-19, 2017, May 14, 2017 (May 14, 2017), XP051272629, pp. 1-6, Retrieved from the Internet: URL:http://www.3gpp.org/ftp/Meetings_3GPP Sync/RAN1/Docs/ [retrieved on May 14, 2017].

International Search Report and Written Opinion—PCT/US2018/043492—ISA/EPO—dated Oct. 5, 2018.

LG Electronics: "Discussion on Bandwidth Part Configurations", 3GPP Draft, R1-1711574 Resource Allocation, 3RD Generation Partnership Project (3GPP), Mobile Competence Centre, 650, Route Des Lucioles, F-06921 Sophia-Antipolis Cedex, France vol. RAN WG1, No. Qingdao, P.R. China, Jun. 30, 2017, Jun. 26, 2017 (Jun. 26, 2017), XP051300754, pp. 1-6, Retrieved from the Internet: URL:http://www.3gpp.org/ftp/Meetings_3GPP Sync/RAN1/Docs/ [retrieved on Jun. 26, 2017].

Samsung: "Power Saving for Wideband NR Carrier", 3GPP Draft, R2-1706423 Power Saving for Wideband NR Carrier, 3rd Generation Partnership Project (3GPP), Mobile Competence Centre, 650, Route Des Lucioles F-06921 Sophia-Antipolis Cedex, France vol. RAN WG2, No. Qingdao, China, Jun. 27-29, 2017, Jun. 26 (Jun. 26, 2017), XP051300929, pp. 1-4, Retrieved from the Internet: URL:http://www.3gpp.org/ftp/Meetings_3GPP Sync/RAN2/Docs/ [retrieved on Jun. 26, 2017].

* cited by examiner

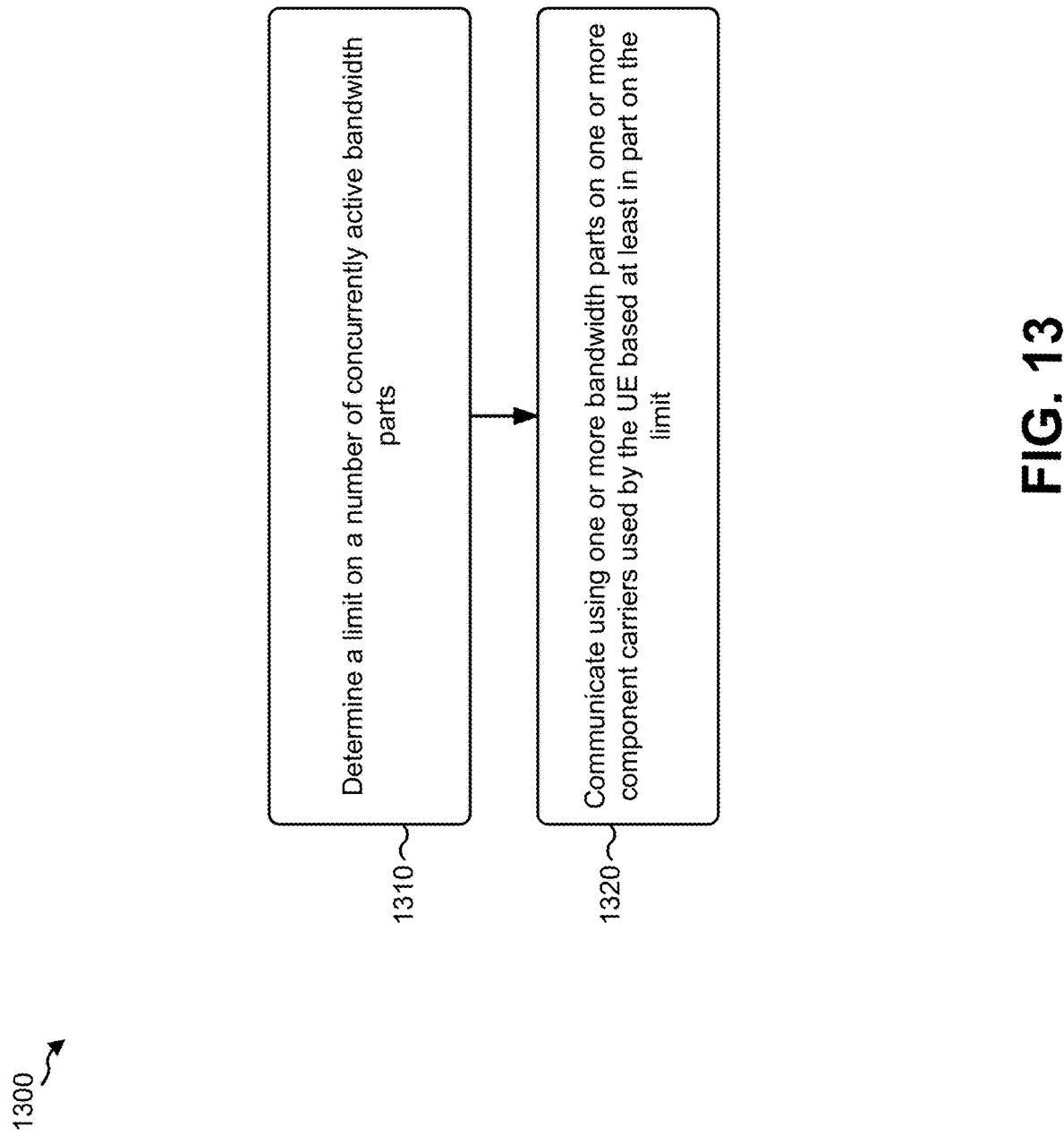

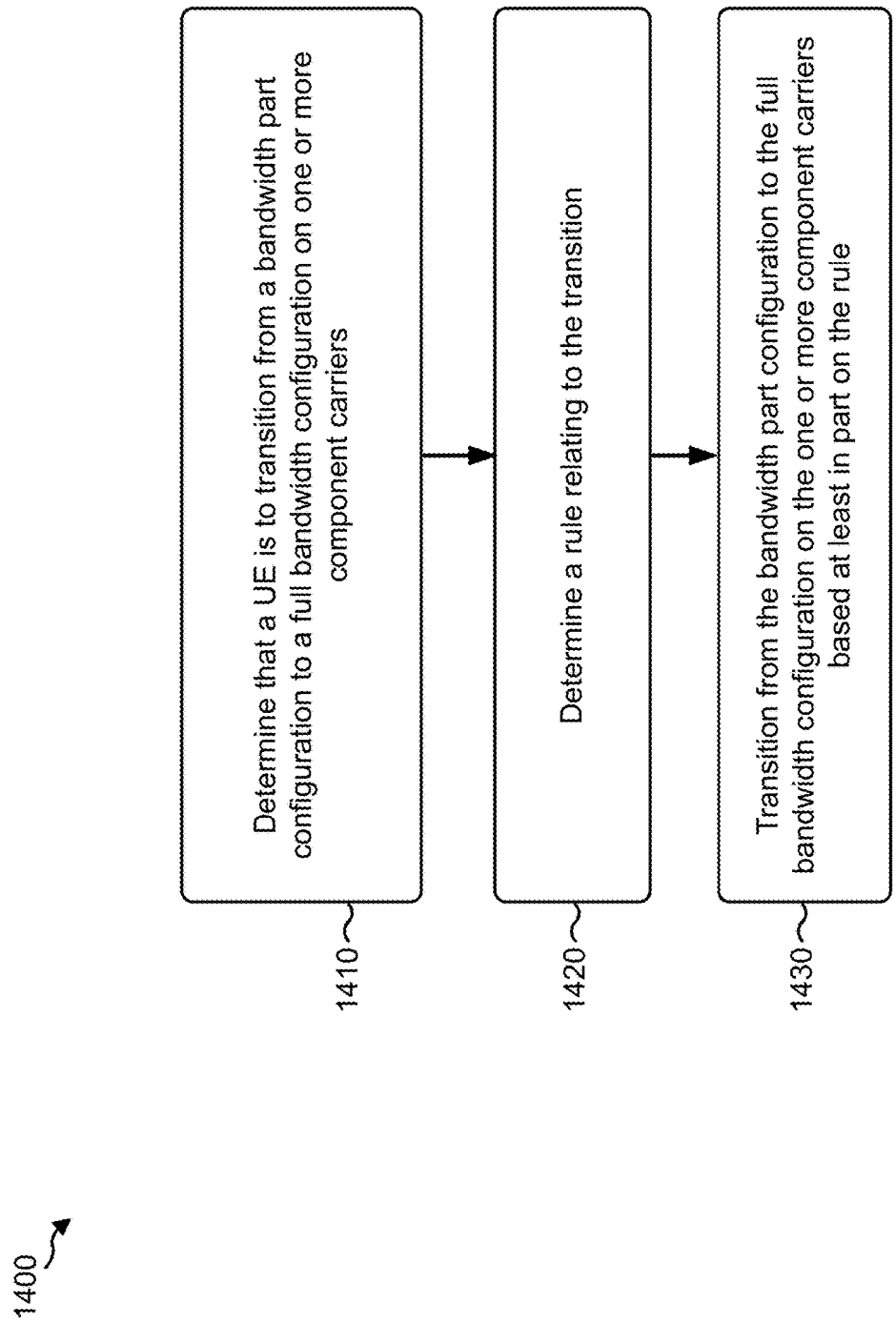

TECHNIQUES AND APPARATUSES FOR BANDWIDTH PART MANAGEMENT

CROSS-REFERENCE TO RELATED APPLICATIONS UNDER 35 U.S.C. § 119

This application claims priority to U.S. Provisional Patent Application No. 62/537,802, filed on Jul. 27, 2017, entitled "TECHNIQUES AND APPARATUSES FOR BANDWIDTH PART MANAGEMENT," which is hereby expressly incorporated by reference herein.

FIELD OF THE DISCLOSURE

Aspects of the present disclosure generally relate to wireless communication, and more particularly to techniques and apparatuses for bandwidth part management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining, by a user equipment (UE), a limit on a number of concurrently active bandwidth parts, wherein the limit applies per component carrier used by the UE or across component carriers used by the UE; and communicating, by the UE, using one or more bandwidth parts on one or more component carriers used by the UE based at least in part on the limit, wherein at least one bandwidth part of the one or more bandwidth parts is less than a full bandwidth that the UE is capable of using.

In some aspects, a method of wireless communication may include determining, by a UE, that the UE is to transition from a bandwidth part configuration to a full bandwidth configuration on one or more component carriers of a plurality of component carriers being used by the UE; determining, by the UE, a rule relating to the transition; and transitioning, by the UE, from the bandwidth part configuration to the full bandwidth configuration on the one or more component carriers based at least in part on the rule.

In some aspects, a UE for wireless communication may include a memory and one or more processors operatively coupled to the memory. The memory and the one or more processors may be configured to determine a limit on a number of concurrently active bandwidth parts, wherein the limit applies per component carrier used by the UE or across component carriers used by the UE; and communicate using one or more bandwidth parts on one or more component carriers used by the UE based at least in part on the limit, wherein at least one bandwidth part of the one or more bandwidth parts is less than a full bandwidth that the UE is capable of using.

In some aspects, a UE for wireless communication may include a memory and one or more processors operatively coupled to the memory. The memory and the one or more processors may be configured to determine that the UE is to transition from a bandwidth part configuration to a full bandwidth configuration on one or more component carriers of a plurality of component carriers being used by the UE; determine a rule relating to the transition; and transition from the bandwidth part configuration to the full bandwidth configuration on the one or more component carriers based at least in part on the rule.

In some aspects, a non-transitory computer-readable medium may store one or more instructions for wireless communication. The one or more instructions, when executed by one or more processors of a UE, may cause the one or more processors to determine a limit on a number of concurrently active bandwidth parts, wherein the limit applies per component carrier used by the UE or across component carriers used by the UE; and communicate using one or more bandwidth parts on one or more component carriers used by the UE based at least in part on the limit, wherein at least one bandwidth part of the one or more bandwidth parts is less than a full bandwidth that the UE is capable of using.

In some aspects, a non-transitory computer-readable medium may store one or more instructions for wireless communication. The one or more instructions, when executed by one or more processors of a UE, may cause the one or more processors to determine that the UE is to transition from a bandwidth part configuration to a full bandwidth configuration on one or more component carriers of a plurality of component carriers being used by the UE; determine a rule relating to the transition; and transition from the bandwidth part configuration to the full bandwidth configuration on the one or more component carriers based at least in part on the rule.

In some aspects, an apparatus for wireless communication may include means for determining a limit on a number of concurrently active bandwidth parts, wherein the limit applies per component carrier used by the apparatus or across component carriers used by the apparatus; and means for communicating using one or more bandwidth parts on one or more component carriers used by the apparatus based at least in part on the limit, wherein at least one bandwidth part of the one or more bandwidth parts is less than a full bandwidth that the apparatus is capable of using.

In some aspects, an apparatus for wireless communication may include means for determining that the apparatus is to transition from a bandwidth part configuration to a full bandwidth configuration on one or more component carriers of a plurality of component carriers being used by the apparatus; means for determining a rule relating to the transition; and means for transitioning from the bandwidth part configuration to the full bandwidth configuration on the one or more component carriers based at least in part on the rule.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 13 and 14 are diagrams illustrating example processes performed, for example, by a user equipment, in accordance with various aspects of the present disclosure.

DETAILED DESCRIPTION

Figure 1:
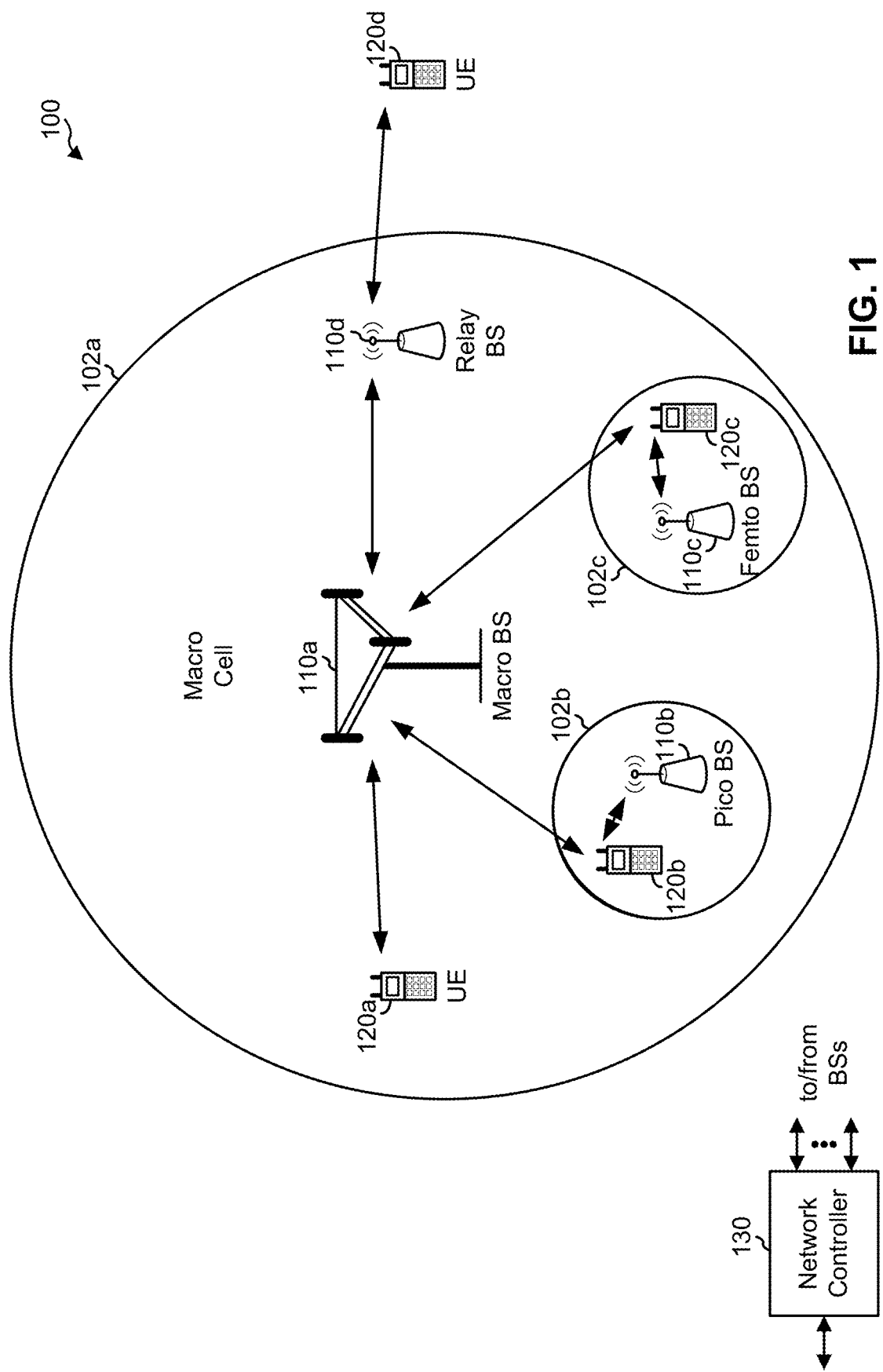
FIG. 1 is a block diagram conceptually illustrating an example of a wireless communication network, in accordance with certain aspects of the present disclosure.

Techniques described herein relate to bandwidth part management. A UE may configure a bandwidth part that is less than a bandwidth over which the UE is capable of communicating (subject to the overall system bandwidth within which the UE is operating), and the UE may configure communications over the bandwidth part (and not the remaining bandwidth over which the UE is capable of communicating) to conserve battery power. The UE may be capable of transitioning between a full bandwidth configuration, where the UE communicates (e.g., transmits or receives information) over a full bandwidth that the UE is capable of using, and a bandwidth part configuration where the UE communicates over less than the full bandwidth that the UE is capable of using. Techniques described herein relate to the management of such bandwidth parts and transitions to reduce battery consumption, conserve network resources, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing 120' that houses components of UE 120, such as processor components, memory components, and/or the like.

One or more of the above types of UEs 120 (e.g., NB-IoT devices and/or other types of UEs 120) may configure communications on a bandwidth part that is less than a full bandwidth that the UE 120 is capable of using, and may communicate with base station 110 using the bandwidth part, as described in more detail elsewhere herein. Additionally, or alternatively, the UE 120 may transition between a bandwidth part configuration and a full bandwidth communication to communicate with base station 110, as described in more detail elsewhere herein.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
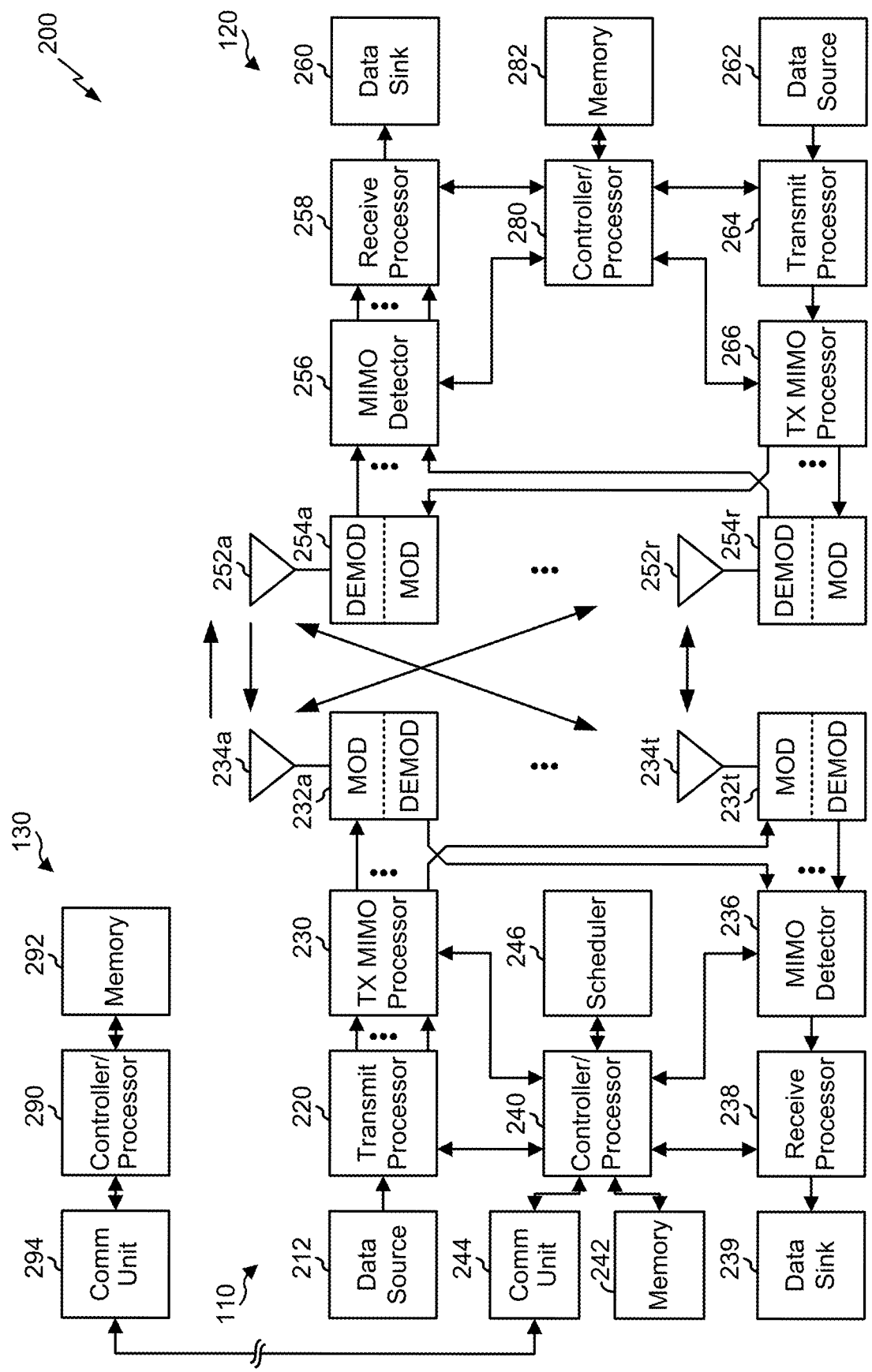
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform bandwidth part management. For example, controller/processor 280 and/or other processors and modules at UE 120, may perform or direct operations of UE 120 to perform bandwidth part management. For example, controller/processor 280 and/or other controllers/processors and modules at UE 120 may perform or direct operations of, for example, process 1300 of FIG. 13, process 1400 of FIG. 14, and/or other processes as described herein. In some aspects, one or more of the components shown in FIG. 2 may be employed to perform example process 1300, example process 1400, and/or other processes for the techniques described herein. Memories 242 and 282 may store data and program codes for base station 110 and UE 120, respectively. The stored program codes, when executed by processor 280 and/or other processors and modules at UE 120, may cause the UE 120 to perform operations described with respect to process 1300 of FIG. 13, process 1400 of FIG. 14, and/or other processes as described herein. A scheduler 246 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

In some aspects, UE 120 may include means for determining a limit on a number of concurrently active bandwidth parts, means for communicating using one or more bandwidth parts based at least in part on the limit, means for configuring one or more bandwidth parts on one or more component carriers used by the UE 120, means for determining that the UE 120 is to transition from a bandwidth part configuration to a full bandwidth configuration on one or more component carriers of a plurality of component carriers being used by the UE 120, means for determining a rule relating to the transition, means for transitioning from the bandwidth part configuration to the full bandwidth configuration on the one or more component carriers based at least in part on the rule, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
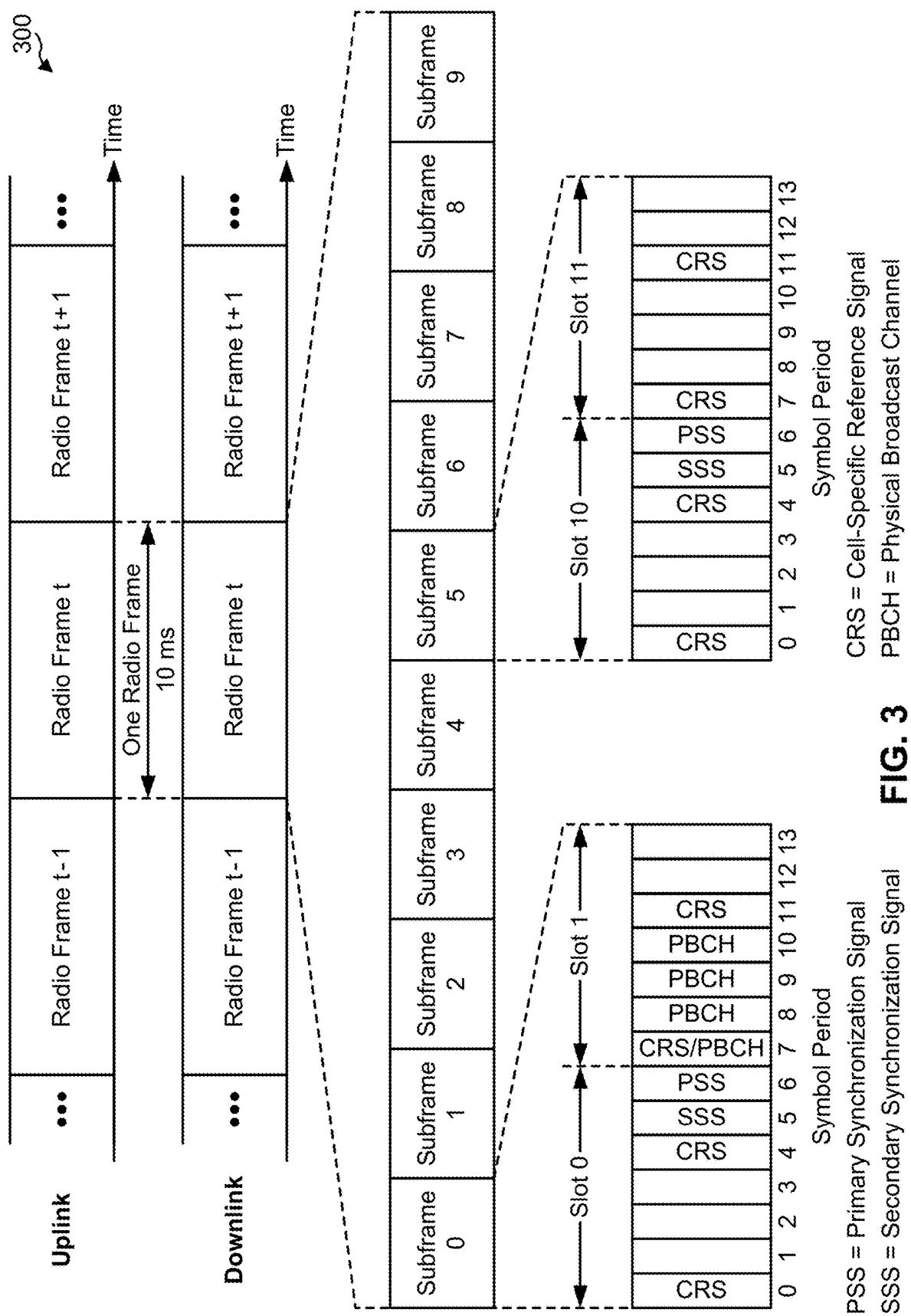
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. In some aspects, a UE may configure one or more bandwidth parts on a subset of slots, frames, subframes, and/or the like, as described in more detail elsewhere herein.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals (e.g., a synchronization signal block, a tracking reference signal, and/or the like) in these locations or in different locations of the subframe.

As indicated above, FIG. 3 is provided merely as an example. Other examples are possible and may differ from what was described with regard to FIG. 3.

Figure 4:
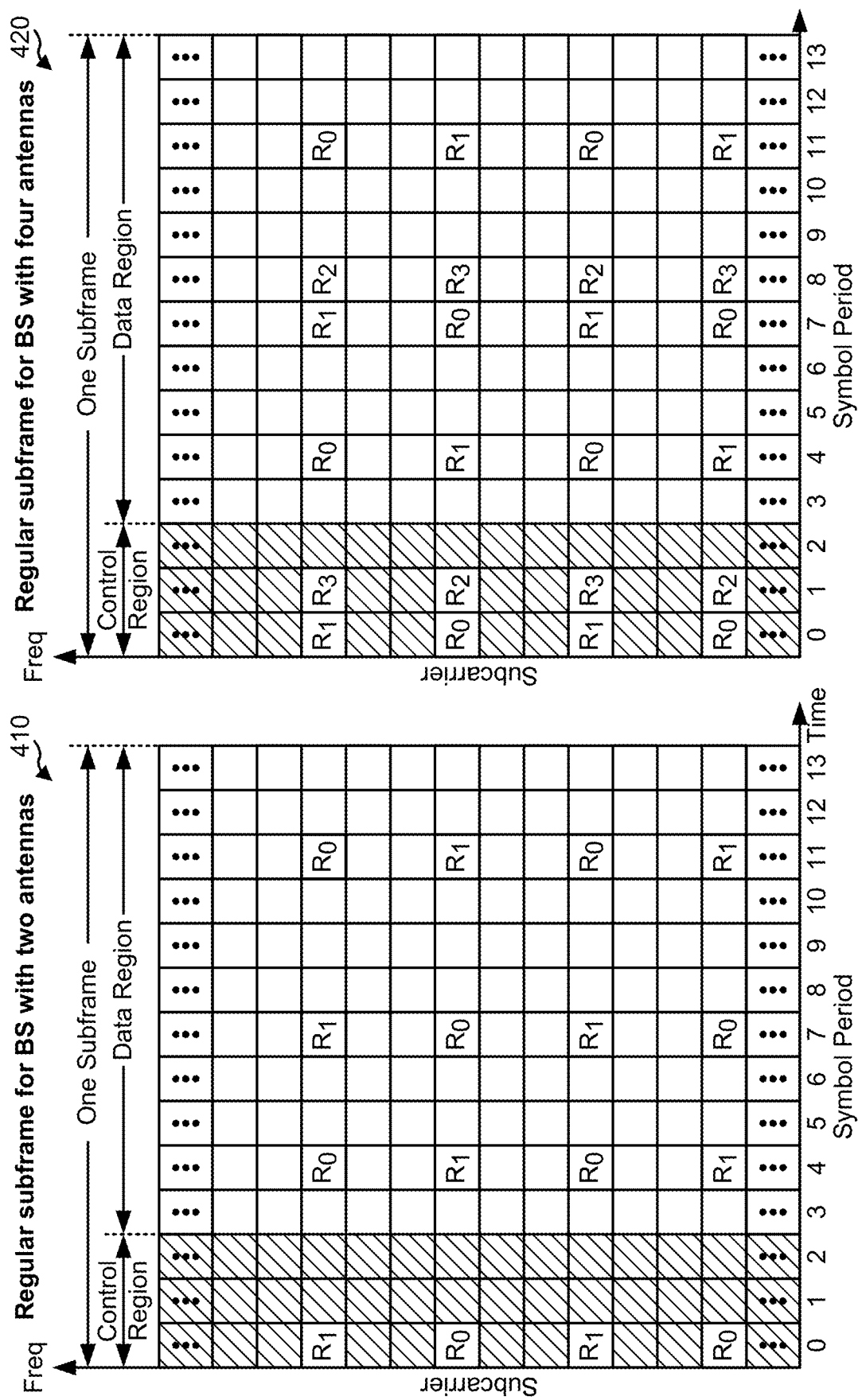
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

FIGS. 5-8 are diagrams illustrating example scenarios associated with bandwidth part management, in accordance with various aspects of the present disclosure.

New Radio (NR) supports the use of multiple different numerologies (e.g., subcarrier spacing options of 15 kHz, 30 kHz, 60 kHz, 120 kHz, and/or the like) and multiple different slot durations (e.g., 0.5 ms, 0.25 ms, 0.125 ms, and/or the like). Furthermore, a wideband bandwidth (e.g., a system bandwidth and/or the like) in NR may be up to 100 MHz (e.g., for the sub-6 GHz frequency band), up to 400 MHz (e.g., for a frequency band above 6 GHz), and/or the like. In some cases, there may be scenarios where a UE only monitors or is only served with a subset of the wideband bandwidth. This subset may be referred to as a bandwidth part, and may be limited due to a UE capability, due to a UE being in a power saving mode, and/or the like.

Figure 5:
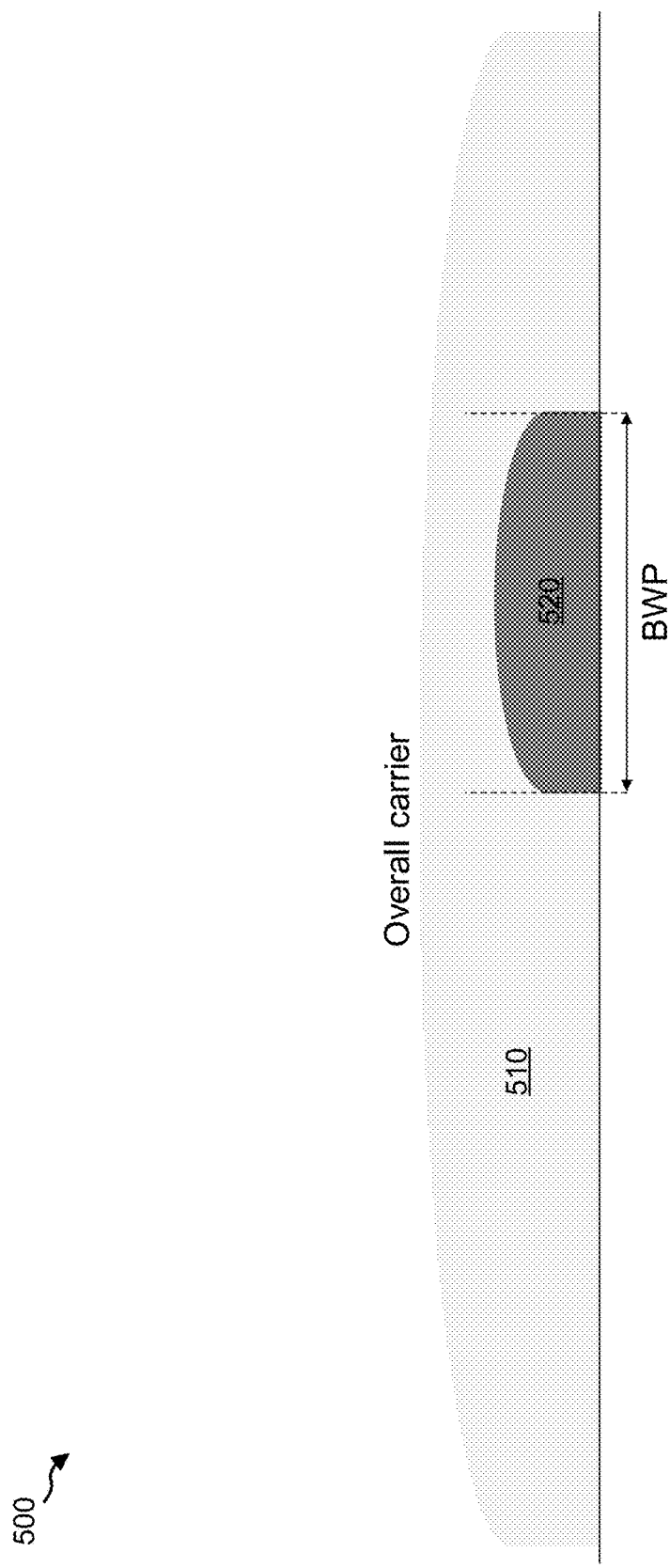
FIGS. 5-8 are diagrams illustrating example scenarios associated with bandwidth part management, in accordance with various aspects of the present disclosure.

For example, as shown in FIG. 5, an overall carrier 510 may span a wideband bandwidth, and a bandwidth part (BWP) 520 may span a portion of the overall carrier 510. For example, the bandwidth part 520 may be less than the overall carrier 510 due to a UE capability, such as a reduced UE bandwidth capability. As a more specific example, the UE may be an NB-IoT UE with a limited bandwidth capability.

Figure 6:
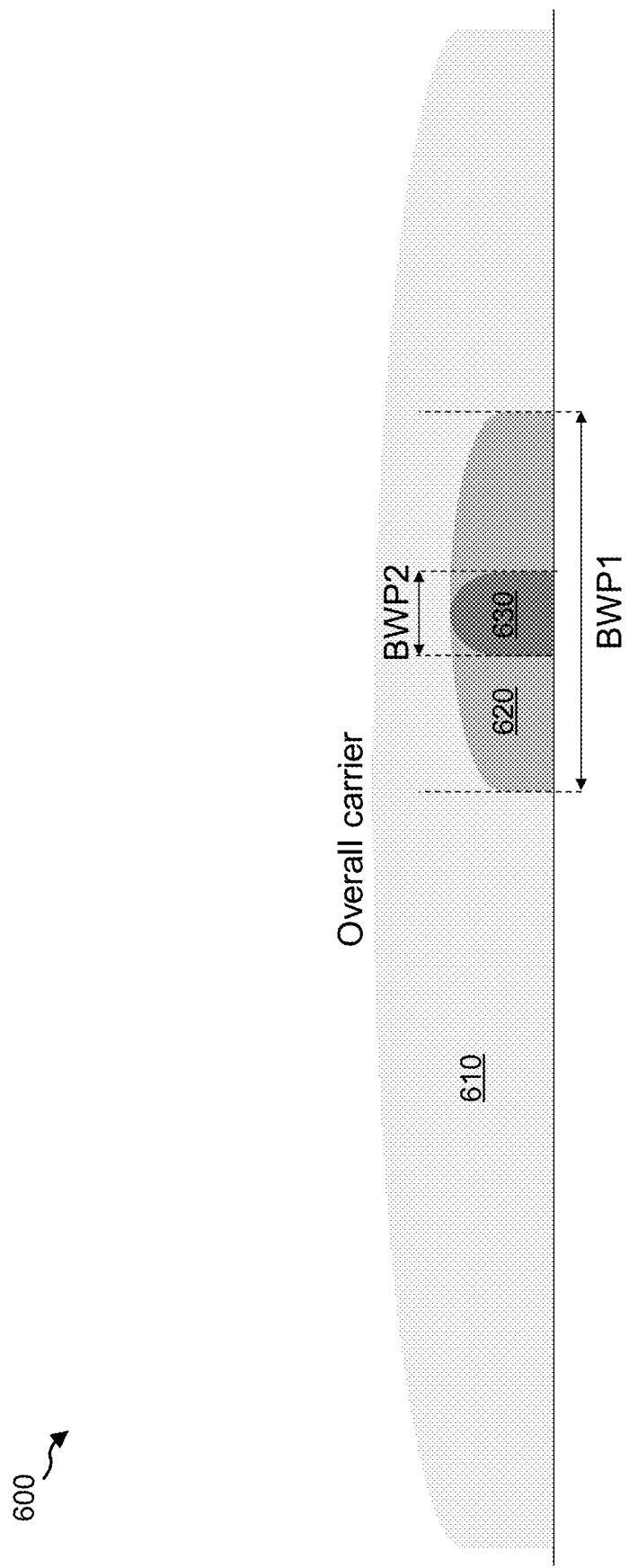

As another example, and as shown in FIG. 6, an overall carrier 610 may span a wideband bandwidth, a first bandwidth part (BWP1) 620 may span a portion of the overall carrier 610, and a second bandwidth part (BWP2) 630 may span a portion of the first bandwidth part. In this case, the first bandwidth part 620 may represent a UE bandwidth capability, and the second bandwidth part 630 may represent a bandwidth to be monitored by or served to the UE. For example, the UE may be capable of communicating over the entire first bandwidth part 620, but may be configured to communicate only in the second bandwidth part 630 (e.g., for a time period) to conserve battery power. In this case, the UE may be capable of transitioning between a full bandwidth configuration, where the UE monitors or is served on the first bandwidth part 620, and a bandwidth part configuration where the UE monitors or is served on the second bandwidth part 630. For example, the UE may transition to the full bandwidth configuration when the UE is scheduled to transmit or receive data (e.g., a threshold amount of data), and may transition to the bandwidth part configuration to conserve battery power when the UE is not scheduled to transmit or receive data.

Figure 7:
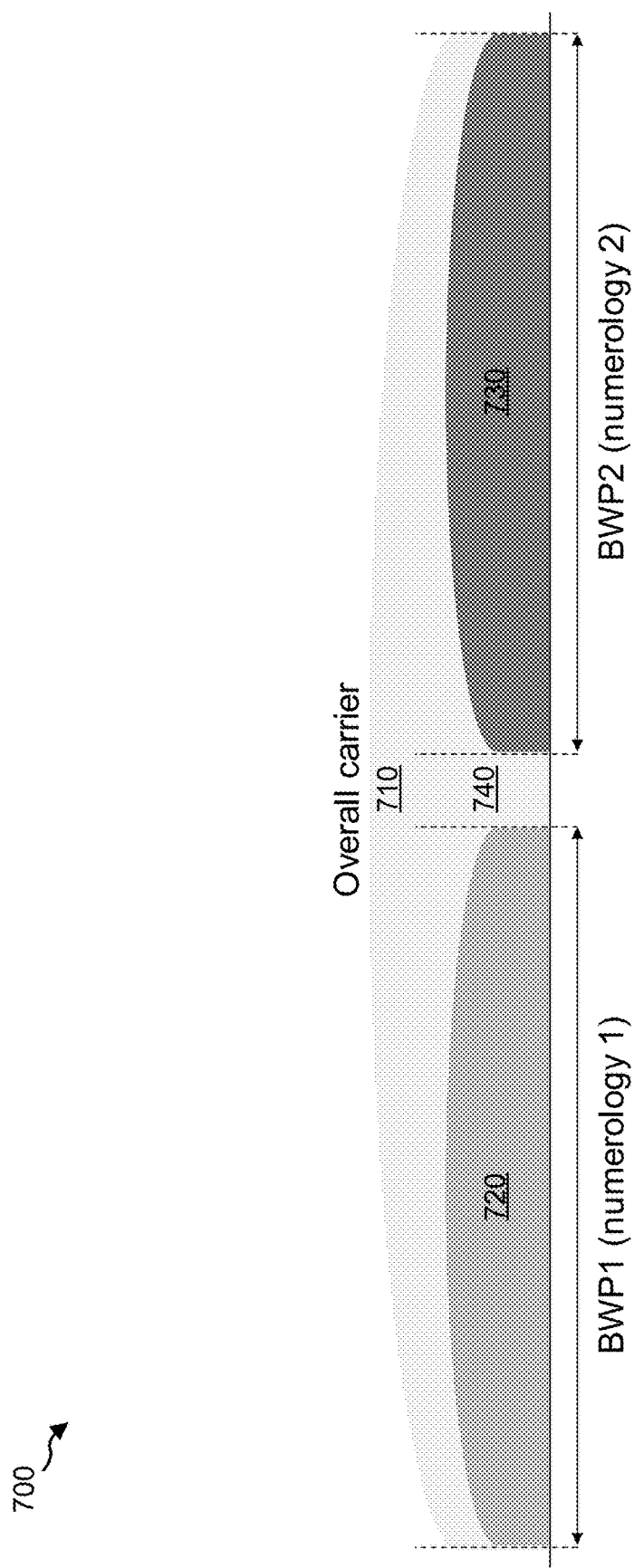

As another example, and as shown in FIG. 7, an overall carrier 710 may span a wideband bandwidth, which may be partitioned into multiple bandwidth parts, such as a first bandwidth part (BWP1) 720 and a second bandwidth part (BWP2) 730. The bandwidth parts 720, 730 may each span a portion of the overall carrier 710. In some aspects, different bandwidth parts may be associated with different numerologies, such as 15 kHz, 30 kHz, 60 kHz, 120 kHz, and/or the like. Additionally, or alternatively, a guard band 740 (e.g., a gap) may be configured between different bandwidth parts to reduce interference between bandwidth parts and/or numerologies.

Figure 8:
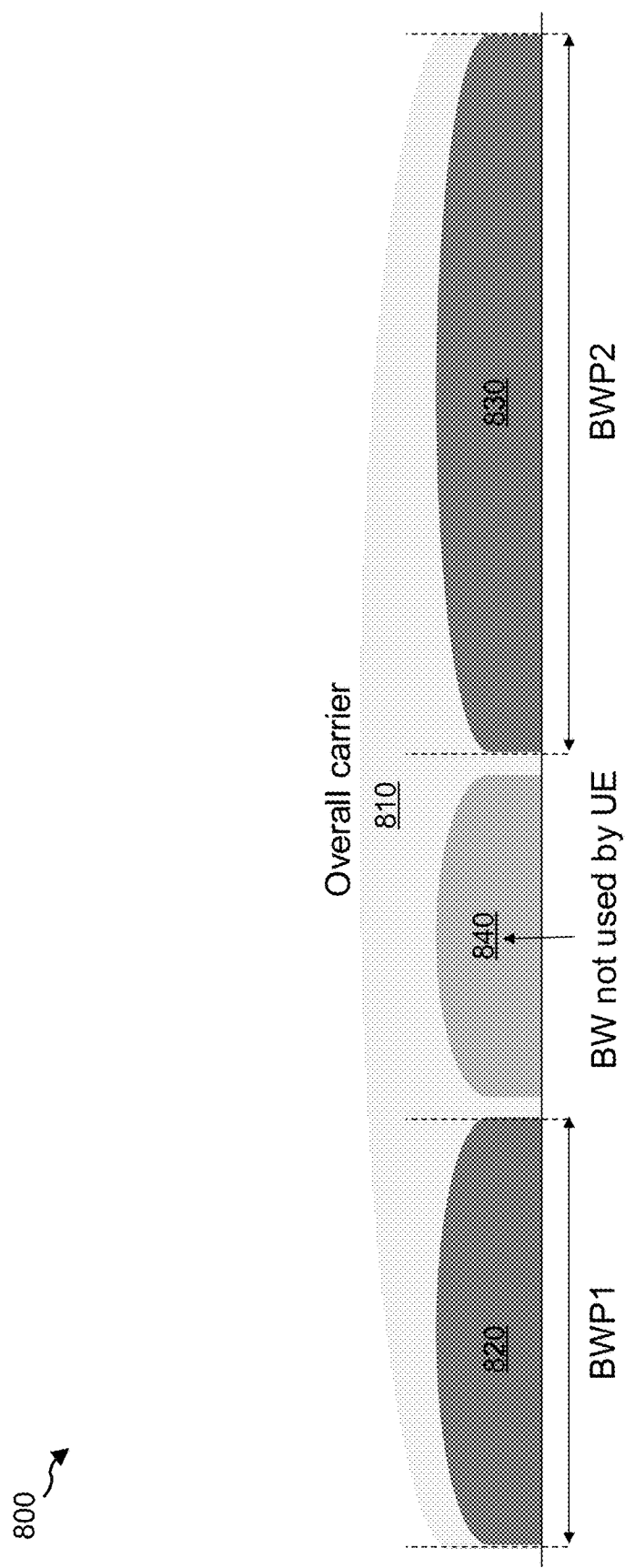

As another example, and as shown in FIG. 8, an overall carrier 810 may span a wideband bandwidth, which may be partitioned into multiple bandwidth parts, such as a first bandwidth part (BWP1) 820 and a second bandwidth part (BWP2) 830. Further, the overall carrier 810 may include a third bandwidth part 840 not used by the UE. For example, the first bandwidth part 820 and the second bandwidth part 830 may be associated with the same network operator, and/or may be used to support intra-band carrier aggregation, while the third bandwidth part 840 may be associated with a different network operator and/or may not be used for carrier aggregation. In some implementations, a synchronization signal (SS) block (e.g., which includes one or more of a PSS, an SSS, a PBCH, and/or the like) may be transmitted on one bandwidth part, and may include information for multiple bandwidth parts to conserve network resources.

While different types of bandwidth parts are described in connection with the scenarios of FIGS. 5-8, techniques described herein relate to configuring a bandwidth part to conserve battery power, as described above in connection with FIG. 6. For example, a UE may configure a bandwidth part, which may correspond to BWP2 630, of a component carrier, which may correspond to BWP1 620. Additionally, or alternatively, the UE may configure one or more bandwidth parts for multiple component carriers, such as in the carrier aggregation scenario described above in connection with FIG. 8. Techniques described herein relate to the management of such bandwidth parts to reduce battery consumption, conserve network resources, and/or the like.

As indicated above, FIGS. 5-8 are provided as examples. Other examples are possible and may differ from what was described in connection with FIGS. 5-8.

Figure 9:
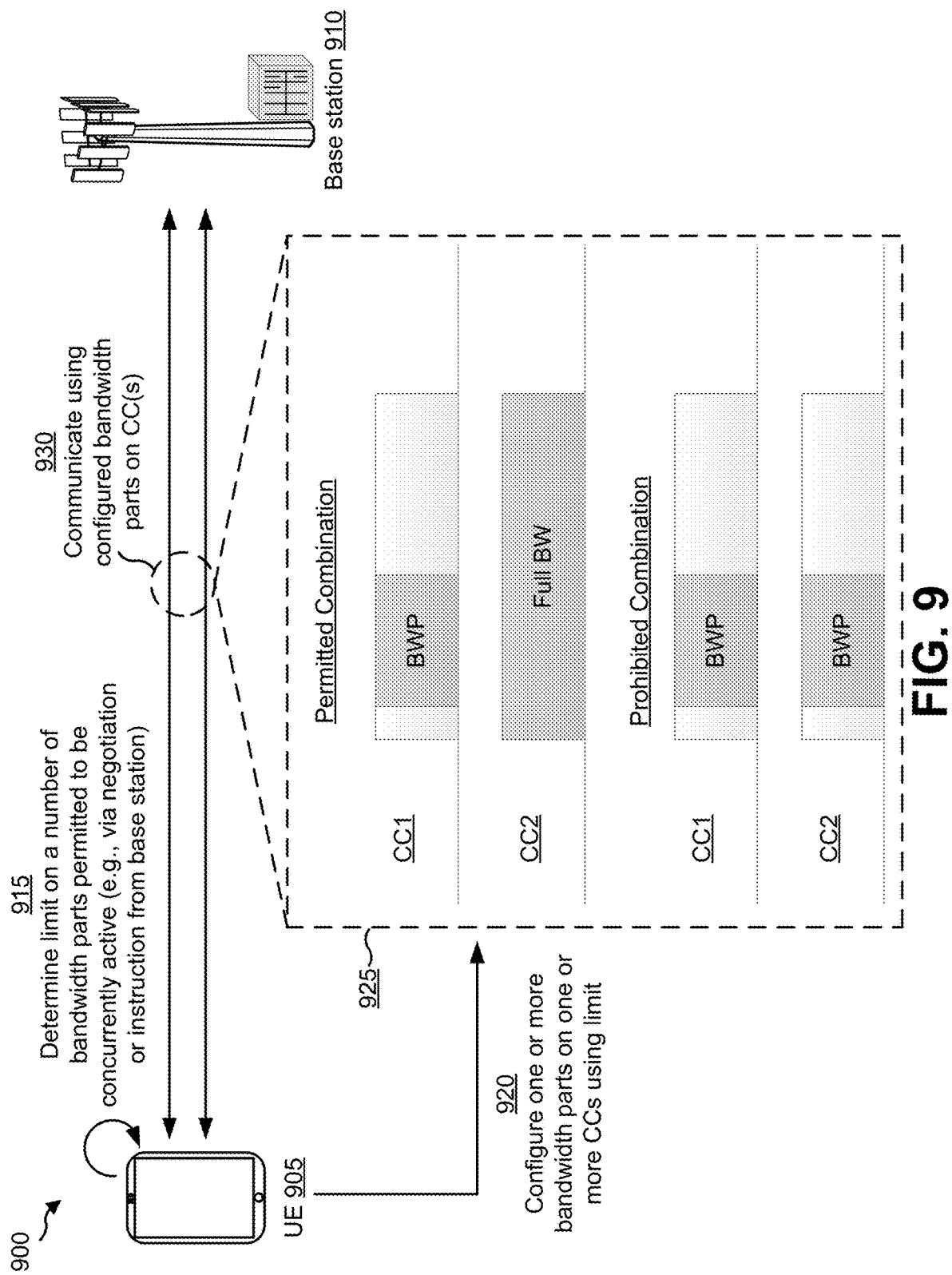
FIGS. 9-12 are diagrams illustrating examples of bandwidth part management, in accordance with various aspects of the present disclosure.

FIG. 9 is a diagram illustrating an example 900 of bandwidth part management, in accordance with various aspects of the present disclosure. As shown in FIG. 9, a UE 905 may communicate with a base station 910. In some aspects, the UE 905 may correspond to one or more UEs described elsewhere herein, such as UE 120 and/or the like. Additionally, or alternatively, the base station 910 may correspond to one or more base stations described elsewhere herein, such as the base station 110 and/or the like.

As shown by reference number 915, the UE 905 may determine a limit on a number of concurrently active bandwidth parts for the UE 905, which may refer to a number of bandwidth parts permitted to be concurrently active for the UE 905 (e.g., due to a configuration and/or the like). In some aspects, the limit on the number of bandwidth parts may apply per component carrier (sometimes referred to herein as a CC) used by the UE 905. For example, the UE 905 may be limited to activating a threshold number of bandwidth parts on a single CC (e.g., a single bandwidth part, two non-contiguous bandwidth parts, and/or the like). Additionally, or alternatively, the limit on the number of bandwidth parts may apply across component carriers used by the UE. For example, the UE 905 may be limited to activating a threshold number of bandwidth parts across all component carriers (e.g., a single bandwidth part across all component carriers, two bandwidth parts across all component carriers, and/or the like).

As described above in connection with FIGS. 5-8, the bandwidth part may be less than a bandwidth over which the UE 905 is capable of communicating, and the UE 905 may configure communications over the bandwidth part (and not the remaining bandwidth over which the UE 905 is capable of communicating) to conserve battery power. The UE 905 may be capable of transitioning between a full bandwidth configuration, where the UE 905 communicates (e.g., transmits or receives information) over an entire bandwidth that the UE 905 is capable of using (subject to overall system bandwidth in which the UE 905 is operating), and a bandwidth part configuration where the UE 905 communicates over less than the entire bandwidth that the UE 905 is capable of using.

In some aspects, the UE 905 may activate a bandwidth part on a component carrier (rather than a full bandwidth on the component carrier) to conserve battery power. However, activating a greater number of component carriers consumes more battery power than activating a smaller number of component carriers. In a case where the UE 905 has a relatively large number of component carriers active (e.g., when the UE 905 has a large amount of data to transmit or receive), the UE 905 is less likely to be in a power saving mode. Thus, in this case, the UE 905 may apply one or more limits (e.g., per CC, across CCs, and/or the like) to the number of bandwidth parts permitted to be concurrently active, which may reduce UE 905 complexity, conserve UE resources used to transition between a bandwidth part configuration and a full bandwidth configuration, increase throughput, and/or the like.

In some aspects, the base station 910 may instruct the UE 905 regarding one or more limits on the number of bandwidth parts permitted to be concurrently active. Additionally, or alternatively, the UE 905 may negotiate the one or more limits with the base station 910. For example, the UE 905 may indicate a number of bandwidth parts and/or a number of CCs that the UE 905 is capable of supporting, and the base station 910 may indicate the limit(s) to the UE 905 based at least in part on this information. In some aspects, the base station 910 may instruct the UE 905 regarding one or more other bandwidth part parameters, described herein, relating to configuring one or more bandwidth parts. Additionally, or alternatively, the UE 905 and the base station 910 may negotiate the one or more bandwidth part parameters.

For example, the UE 905 may indicate one or more requested bandwidth part parameters to the base station 910, and the base station 910 may indicate one or more bandwidth part parameters to be used by the UE 905 during configuration of the one or more bandwidth parts. In some aspects, the base station 910 may confirm a bandwidth part parameter requested by the UE 905. In some aspects, the base station 910 may override a bandwidth part parameter requested by the UE 905. A bandwidth part parameter may include, for example, a bandwidth for a bandwidth part, a number of bandwidth parts per component carrier, a number of bandwidth parts across component carriers, a numerology for a bandwidth part, and/or the like. In this way, bandwidth parts may be flexibly configured.

As shown by reference number 920, the UE 905 may configure one or more bandwidth parts on one or more component carriers used by the UE 905 based at least in part on the limit on the number of bandwidth parts. As an example, and as shown in by reference number 925, the limit may be a single bandwidth part across all components carriers used by the UE 905. In this case, the UE 905 would be permitted to activate a bandwidth part configuration on a first CC, shown as CC1 (e.g., a primary CC), and to activate a full bandwidth configuration on a second CC, shown as CC2 (e.g., a secondary CC). However, the UE 905 would not be permitted to activate a bandwidth part configuration on both the first CC and the second CC, as shown.

As an example, the UE 905 may be configured with 2 CCs, where each CC has a bandwidth of 100 MHz. In this case, given an example limit of a single bandwidth part across all component carriers, a possible configuration for the UE 905 may include a first case where the first CC (e.g., a primary CC or PCell) is configured with a bandwidth part (e.g., of 20 MHz) and the second CC (e.g., a secondary CC or SCell) is not active, a second case where the first CC is configured with a bandwidth part (e.g., of 20 MHz) and the second CC is configured with a full bandwidth configuration (e.g., of 100 MHz), a third case where the first CC is configured with a full bandwidth configuration (e.g., of 100 MHz) and the second CC is not active, or a fourth case where both the first CC and the second CC are configured with a full bandwidth configuration. As another example, a possible configuration for the UE 905 may include the first case, the third case, and/or the fourth case, while the second case is prohibited.

In some aspects, the limit includes a first number of bandwidth parts permitted to be concurrently active per CC used by the UE 905 and a second number of bandwidth parts permitted to be concurrently active across all CCs used by the UE 905. Additional details of this aspect are described below in connection with FIG. 10.

In some aspects, the UE 905 may configure the one or more bandwidth parts for uplink communication. In this case, the UE 905 may transmit one or more communications to the base station 910 (e.g., a reference signal, uplink control information, uplink data, and/or the like) on the configured bandwidth part(s). In some aspects, the limit on the number of bandwidth parts (e.g., for uplink communications) is based at least in part on a number of uplink control channels configured for the UE 905 (e.g., a number of PUCCHs configured for the UE 905, a configuration of a PUCCH group for the UE 905, and/or the like). For example, if the UE 905 is configured with a single PUCCH (e.g., on the primary CC), then the UE 905 may configure a single bandwidth part for uplink communications (e.g., on the primary CC). As another example, if the UE 905 is configured with two PUCCHs (e.g., one on the primary CC and one on a primary secondary CC), then the UE 905 may configure two bandwidth parts for uplink communication (e.g., one on the primary CC and one on a primary secondary CC). In some aspects, the UE 905 may signal a UE capability regarding a number of supported uplink control channels (e.g., single PUCCH, dual PUCCH, and/or the like), and may be instructed by and/or may negotiate with the base station 910 to determine the number of bandwidth parts to be configured based at least in part on the UE capability.

Additionally, or alternatively, the UE 905 may configure the one or more bandwidth parts for downlink communication. In this case, the UE 905 may receive one or more communications from the base station 910 (e.g., a reference signal, a page, downlink control information, downlink data, and/or the like) on the configured bandwidth part(s). In some aspects, the limit on the number of bandwidth parts (e.g., for downlink communications) is based at least in part on a number of uplink control channels configured for the UE 905, as described above. For example, if the UE 905 is configured with a single PUCCH group, then the UE 905 may configure a single bandwidth part for downlink communications. As another example, if the UE 905 is configured with multiple PUCCH groups (e.g., two PUCCH groups), then the UE 905 may configure up to one bandwidth part, per PUCCH group, for downlink communications.

As described above, in some aspects, the UE 905 may configure the one or more bandwidth parts based at least in part on an indication from the base station 910. In this case, the UE 905 may transmit an acknowledgement (ACK) or a negative acknowledgement (NACK) to confirm receipt or failed receipt, respectively, of the indication. In some aspects, the UE 905 may receive the indication from the base station 910 via a downlink data channel (e.g., a PDSCH). In this case, the UE 905 may transmit an ACK using a HARQ response to the indication received via the downlink data channel. In some aspects, the UE 905 may not receive the indication from the base station 910 via a downlink data channel. For example, the UE 905 may receive the indication from the base station 910 via downlink control information (DCI) (e.g., via an explicit indication in DCI that carries a scheduling assignment and/or a grant, via an explicit indication in DCI that does not carry a scheduling assignment and/or a grant, via an implicit indication indicated by the presence of DCI, and/or the like), via a media access control (MAC) control element (CE), via radio resource control (RRC) signaling, and/or the like. In this case, the UE 905 may transmit an explicit ACK as an explicit response to the indication (e.g., an explicit response to the DCI, the MAC CE, and/or the like). In some aspects, the indication is at least one of an activation or a deactivation of at least one of the one or more bandwidth parts. In this way, the base station 910 can confirm whether the UE 905 is to be configured according to a configuration indication by the base station 910.

As shown by reference number 930, the UE 905 and the base station 910 may communicate using the one or more CCs, which may include communicating on the one or more bandwidth parts configured on the one or more CCs (e.g., on the uplink and/or the downlink, as described above). In some aspects, the UE 905 may limit monitoring of communications to the frequencies included in the bandwidth part, thereby conserving UE resources as compared to monitoring a full bandwidth of a CC. Furthermore, by limiting uplink and/or downlink communications to the bandwidth part(s), the UE 905 conserves UE resources and battery power.

In some aspects, the UE 905 may configure the one or more bandwidth parts on a subset of slots or symbols, and may monitor the one or more bandwidth parts on the subset of slots or symbols (e.g., without monitoring the one or more bandwidth parts on other slots or symbols). As an example, for a CC configured with a bandwidth part, the UE 905 may monitor the bandwidth part in every other symbol, every other slot, every third symbol, every third slot, and/or the like. In this way, the UE 905 may conserve battery power as compared to monitoring the configured bandwidth parts on all slots or symbols. In a similar manner as described above, the UE 905 may determine the subset of slots and/or symbols based at least in part on an instruction from the base station 910 and/or a negotiation with the base station 910.

In some aspects, the UE 905 may configure the one or more bandwidth parts on the subset of slots or symbols based at least in part on a condition. The condition may relate to, for example, a number of component carriers configured to be used by the UE 905, a number of the one or more bandwidth parts configured by the UE 905, and/or the like. For example, if the UE 905 is monitoring a single bandwidth part on a single CC, then the UE 905 may monitor the bandwidth part on a first set of slots and/or symbols (e.g., all slots, all symbols, and/or the like). As another example, if the UE 905 monitors a bandwidth part on a first CC and also monitors a second CC (e.g., with or without a bandwidth part on the second CC), then the UE 905 may monitor the bandwidth part on the first CC on a second set of slots and/or symbols (e.g., every other slot, every other symbol, and/or the like). In this way, the UE 905 may control and/or reduce battery consumption (e.g., by offsetting additional monitoring of an additional bandwidth part and/or CC with a reduction in the number of slots and/or symbols that are monitored).

In some aspects, the UE 905 may restrict a search space to be monitored for the subset of slots and/or symbols. For example, the UE 905 may reduce search space monitoring for the subset of slots and/or symbols when more CCs are active. For example, the UE 905 may only monitor higher PDCCH aggregation levels (e.g., aggregation level 4, aggregation level 8, and/or the like), and may omit monitoring of lower PDCCH aggregation levels (e.g., aggregation level 1, aggregation level 2, and/or the like). In this way, the UE 905 may conserve battery power by reducing a set of decoding candidates that are blindly decoded by the UE 905. In a similar manner as described above, the UE 905 may determine the restricted search space based at least in part on an instruction from the base station 910 and/or a negotiation with the base station 910.

As indicated above, FIG. 9 is provided as an example. Other examples are possible and may differ from what was described in connection with FIG. 9.

Figure 10:
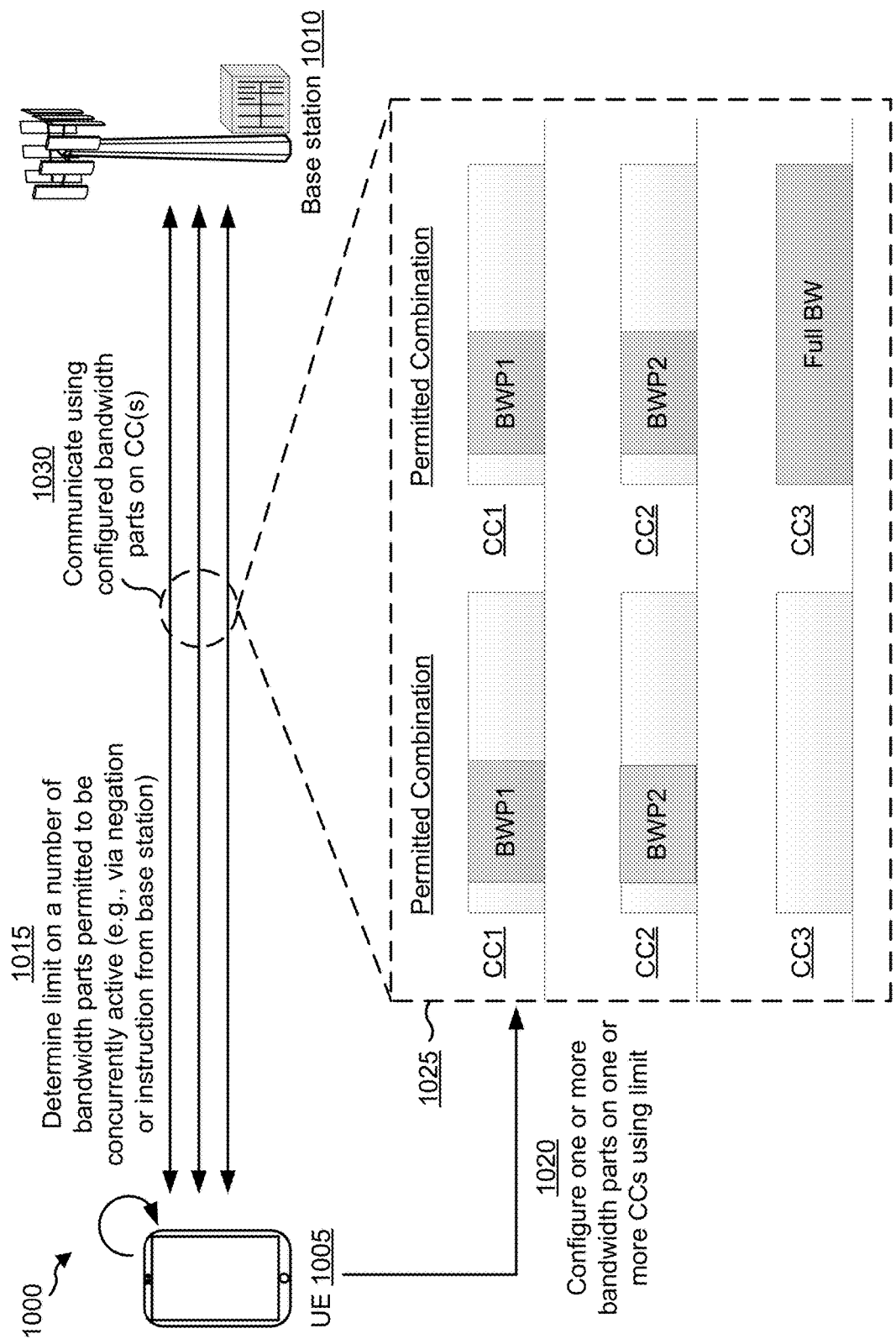

FIG. 10 is a diagram illustrating another example 1000 of bandwidth part management, in accordance with various aspects of the present disclosure. As shown in FIG. 10, a UE 1005 may communicate with a base station 1010. In some aspects, the UE 1005 may correspond to one or more UEs described elsewhere herein, such as UE 120, UE 905, and/or the like. Additionally, or alternatively, the base station 1010 may correspond to one or more base stations described elsewhere herein, such as the base station 110, base station 910, and/or the like.

As shown by reference number 1015, the UE 1005 may determine a limit on a number of bandwidth parts permitted to be concurrently active for the UE 1005, as described above in connection with FIG. 9.

As shown by reference number 1020, the UE 1005 may configure one or more bandwidth parts on one or more component carriers used by the UE 1005 based at least in part on the limit on the number of bandwidth parts, as described above in connection with FIG. 9. As an example, and as shown in by reference number 1025, the limit may include a first number of bandwidth parts permitted to be concurrently active per CC used by the UE 1005 and a second number of bandwidth parts permitted to be concurrently active across all CCs used by the UE 1005. In the example of FIG. 10, the first number is one and the second number is two. In this case, the UE 1005 would be permitted to activate a first bandwidth part configuration on a first CC, shown as CC1 (e.g., a primary CC), and to activate a second bandwidth part configuration on a second CC, shown as CC2 (e.g., a secondary CC). However, the UE 1005 would not be permitted to activate a third bandwidth part configuration on a third CC, shown as CC3 (e.g., another secondary CC). In this case, the UE 1005 may either not use the third CC, or may configure a full bandwidth configuration on the third CC, as shown.

In some aspects, the first number and the second number may be the same. For example, the UE 1005 may be limited to configuring one bandwidth part per CC and one bandwidth part across all CCs. In some aspects, the first number and the second number may be different. For example, the first number may be less than the second number, as described above and as shown in FIG. 10. In this way, the UE 1005 can multiplex communications on different CCs, which may potentially use different numerology. In some aspects, if there are two or more bandwidth parts across all CCs, the two or more bandwidth parts may be restricted to have the same bandwidth. Alternatively, the two or more bandwidth parts may have different bandwidths. Furthermore, bandwidth part management may be flexibly configured.

In some aspects, the UE 1005 and/or the base station 1010 may coordinate load balancing across CCs. For example, the UE 1005 may be configured to monitor bandwidth parts on multiple CCs, and the base station 1010 may indicate one of the CCs (or a subset of the CCs, or all of the CCs, etc.) for which the full bandwidth is to be activated. In some aspects, the indication may be based at least in part on a load associated with each of the multiple CCs. In some aspects, the UE 1005 and/or the base station 1010 may use cross-CC activation (e.g., via DCI, a MAC CE, and/or the like). For example, an indication may be sent on a bandwidth part of a first CC to activate a full bandwidth on the first CC and/or one or more other CCs. In this way, network resources may be conserved.

As shown by reference number 1030, the UE 1005 and the base station 1010 may communicate using the one or more CCs, which may include communicating on the one or more bandwidth parts configured on the one or more CCs, as described above in connection with FIG. 9. By limiting uplink and/or downlink communications to the bandwidth part(s), the UE 1005 conserves UE resources and battery power.

As indicated above, FIG. 10 is provided as an example. Other examples are possible and may differ from what was described in connection with FIG. 10.

Figure 11:
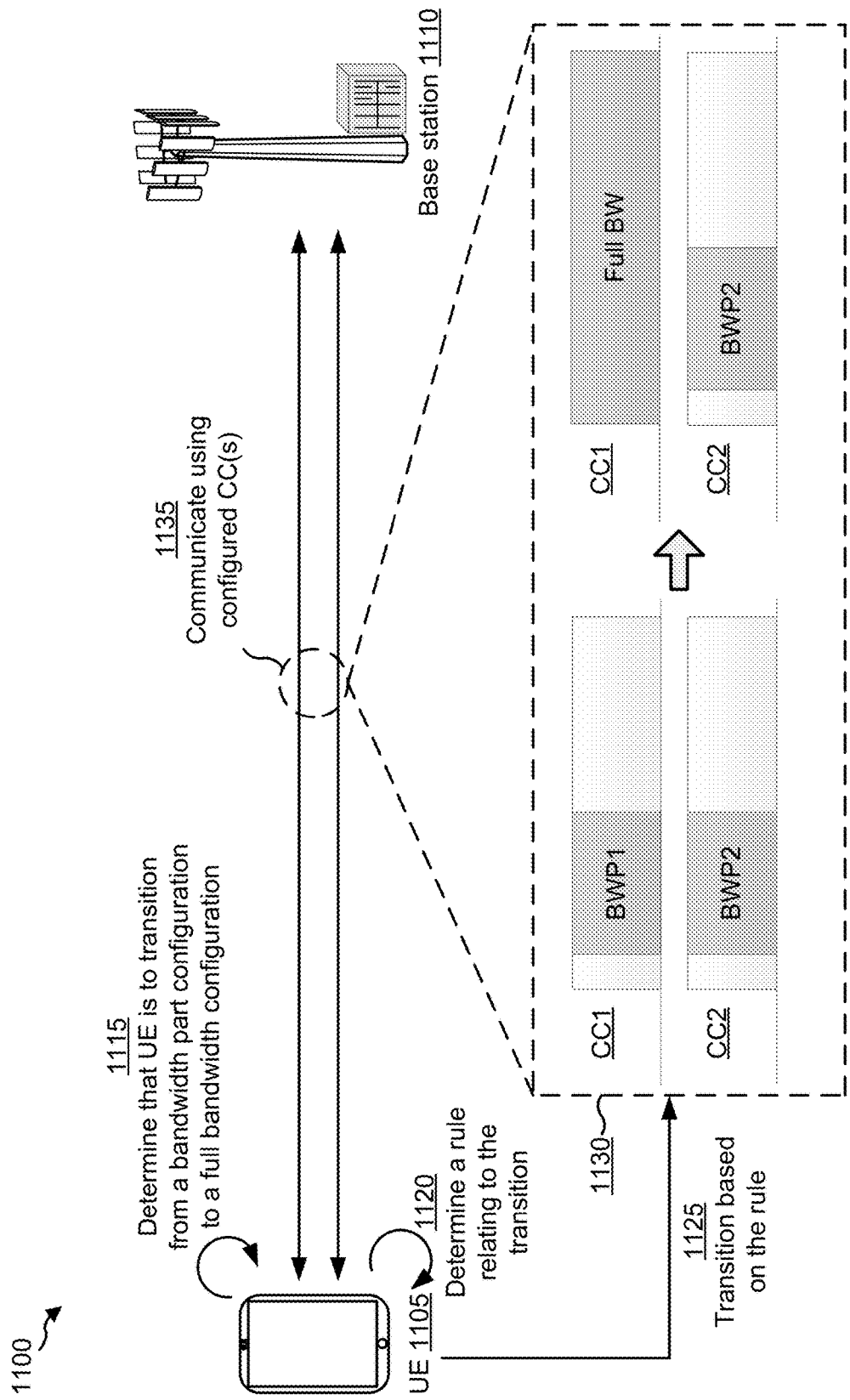

FIG. 11 is a diagram illustrating another example 1100 of bandwidth part management, in accordance with various aspects of the present disclosure. As shown in FIG. 11, a UE 1105 may communicate with a base station 1110. In some aspects, the UE 1105 may correspond to one or more UEs described elsewhere herein, such as UE 120, UE 905, UE 1005, and/or the like. Additionally, or alternatively, the base station 1110 may correspond to one or more base stations described elsewhere herein, such as the base station 110, base station 910, base station 1010, and/or the like.

As shown by reference number 1115, the UE 1105 may determine that the UE 1105 is to transition from a bandwidth part configuration to a full bandwidth configuration on one or more component carriers of a plurality of component carriers being used by the UE 1105. In some aspects, the UE 1105 may determine that the UE 1105 is to transition based at least in part on information received from the base station 1110, such as a grant, a page, downlink data, and/or the like. Additionally, or alternatively, the UE 1105 may determine that the UE 1105 is to transition without receiving an indication from the base station 1110. For example, the UE 1105 may remain in the bandwidth part configuration until there is data for the UE 1105 to transmit and/or receive (e.g., a threshold amount of payload of data). In this way, the UE 1105 may conserve battery power while still being available for data communications. As one example, the UE 1105 may remain in a bandwidth part configuration in the uplink when the UE 1105 has no UL data in a UE buffer. When UL data arrives in the buffer, the UE 1105 may start to transmit a scheduling request (SR), or may start to transmit on an UL data channel. In this case, the UE 1105 may implicitly transition from the bandwidth part configuration to a full bandwidth configuration in the uplink (e.g., up to the bandwidth capability of the UE 1105).

As shown by reference number 1120, the UE 1105 may determine a rule relating to the transition. In some aspects, the rule may be indicated by the base station 1110 and/or negotiated between the UE 1105 and the base station 1110, in a similar manner as described elsewhere herein. In some aspects, the rule may be hard coded in memory of the UE 1105.

In some aspects, the rule may indicate a CC that is to be transitioned to the full bandwidth configuration before any other CCs of the plurality of CCs used by the UE 1105. For example, the rule may indicate that the UE 1105 is to transition a primary CC to the full bandwidth configuration before transitioning any other CCs (e.g., any secondary CCs) to the full bandwidth configuration. In this case, the primary CC may be configured with the full bandwidth configuration (e.g., up to a UE bandwidth capability), while one or more secondary CCs may be configured with the bandwidth part configuration (e.g., according to one or more limits, as described above in connection with FIGS. 9 and 10). In this way, the UE 1105 may activate the full bandwidth configuration on higher priority CCs before activating the full bandwidth configuration on lower priority CCs, which may improve throughput and/or the like.

Additionally, or alternatively, the rule may indicate an order in which two or more of the plurality of component carriers, used by the UE 1105, are to be transitioned to the full bandwidth configuration. For example, the rule may indicate that a primary CC is to be transitioned before a primary secondary CC, that the primary secondary CC is to be transitioned before another secondary CC, and/or the like. In some aspects, the rule may define an order for all of the CCs being used by the UE 1105. In this way, the UE 1105 may activate the full bandwidth configuration on higher priority CCs before activating the full bandwidth configuration on lower priority CCs, which may improve throughput and/or the like.

Additionally, or alternatively, the rule may indicate a group of CCs, of the plurality of CCs used by the UE 1105, that are to be transitioned to the full bandwidth configuration together. For example, two or more CCs may be grouped together such that the UE 1105 activates a full bandwidth configuration on the two or more CCs together (e.g., at the same time, concurrently, back-to-back, and/or the like). In some aspects, the group may include all of the CCs used by the UE 1105. In this case, all of the CCs may be transitioned to the full bandwidth configuration together. In this way, the UE 1105 may maximize the potential throughput and/or reduce a time period for transmitting and/or receiving data, and may transition one or more CCs back to the bandwidth part configuration after the transmission and/or reception is complete.

As shown by reference number 1125, the UE 1105 may transition from the bandwidth part configuration to the full bandwidth configuration on the one or more component carriers based at least in part on the rule. As an example, and as shown by reference number 1130, the UE 1105 may transition a first CC, shown as CC1, from a bandwidth part configuration to a full bandwidth configuration. In this example, the rule may indicate that the first CC is to be transitioned before a second CC, shown as CC2. Thus, in this case, the second CC may remain in the bandwidth part configuration.

As shown by reference number 1135, the UE 1105 and the base station 1110 may communicate using the configured CCs, which may include communicating on one or more full bandwidths of one or more CCs (e.g., the first CC, shown as CC1) and/or communicating on one or more bandwidth parts of one or more CCs (e.g., the second CC, shown as CC2). The UE 1105 and the base station 1110 may communicate using the configured CCs on the uplink and/or the downlink, as described elsewhere herein. By configuring a full bandwidth configuration on one or more CCs, the UE 1105 may increase throughput, reduce latency, and/or the like.

In some aspects, the UE 1105 may transition back to the bandwidth part configuration, such as by using one or more techniques described above in connection with FIGS. 9 and 10. For example, the UE 1105 may transition back to the bandwidth part configuration on one or more CCs based at least in part on an indication that a data transmission and/or reception (e.g., with a threshold payload size) is complete, based at least in part on expiration of a timer, based at least in part on an indication from the base station 1110 (e.g., in RRC signaling, DCI, a MAC CE, and/or the like), based at least in part on a configured time pattern, and/or the like. In this way, the UE 1105 may conserve battery power.

In some aspects, a numerology corresponding to the full bandwidth configuration may be different from a numerology corresponding to the bandwidth part configuration. For example, the bandwidth part configuration may use a numerology of 15 kHz, and the full bandwidth configuration may use a numerology of 30 kHz. Thus, in some aspects, the numerology may be indicated (e.g., by the UE 1105 and/or the base station 1110) in association with the transition. For example, the UE 1105 and/or the base station 1110 may indicate the numerology corresponding to the full bandwidth configuration in association with a transition to the full bandwidth configuration. Additionally, or alternatively, the UE 1105 and/or the base station 1110 may indicate the numerology corresponding to the bandwidth part configuration in association with a transition to the bandwidth part configuration (e.g., using one or more techniques described above in connection with FIGS. 9 and 10).

In some aspects, the numerology may be explicitly signaled as part of a transition procedure, such as by using radio resource control (RRC) signaling, DCI, a MAC CE, and/or the like. Additionally, or alternatively, the numerology may be signaled in association with scheduling on a data channel (e.g., a PDSCH, a PUSCH, and/or the like) and/or a control channel (e.g., a PDCCH, a PUCCH, and/or the like), such as via a grant. In this way, the UE 1105 and the base station 1110 may coordinate communications on the full bandwidth and/or the bandwidth part.

In some aspects, the UE 1105 may transmit and/or receive one or more reference signals outside of the bandwidth part prior to and/or in association with the transition to the full bandwidth. In this way, the UE 1105 may quickly transition to the full bandwidth configuration and may take channel conditions into consideration shortly after the transition. Additional details are provided below in connection with FIG. 12.

As indicated above, FIG. 11 is provided as an example. Other examples are possible and may differ from what was described in connection with FIG. 11.

Figure 12:
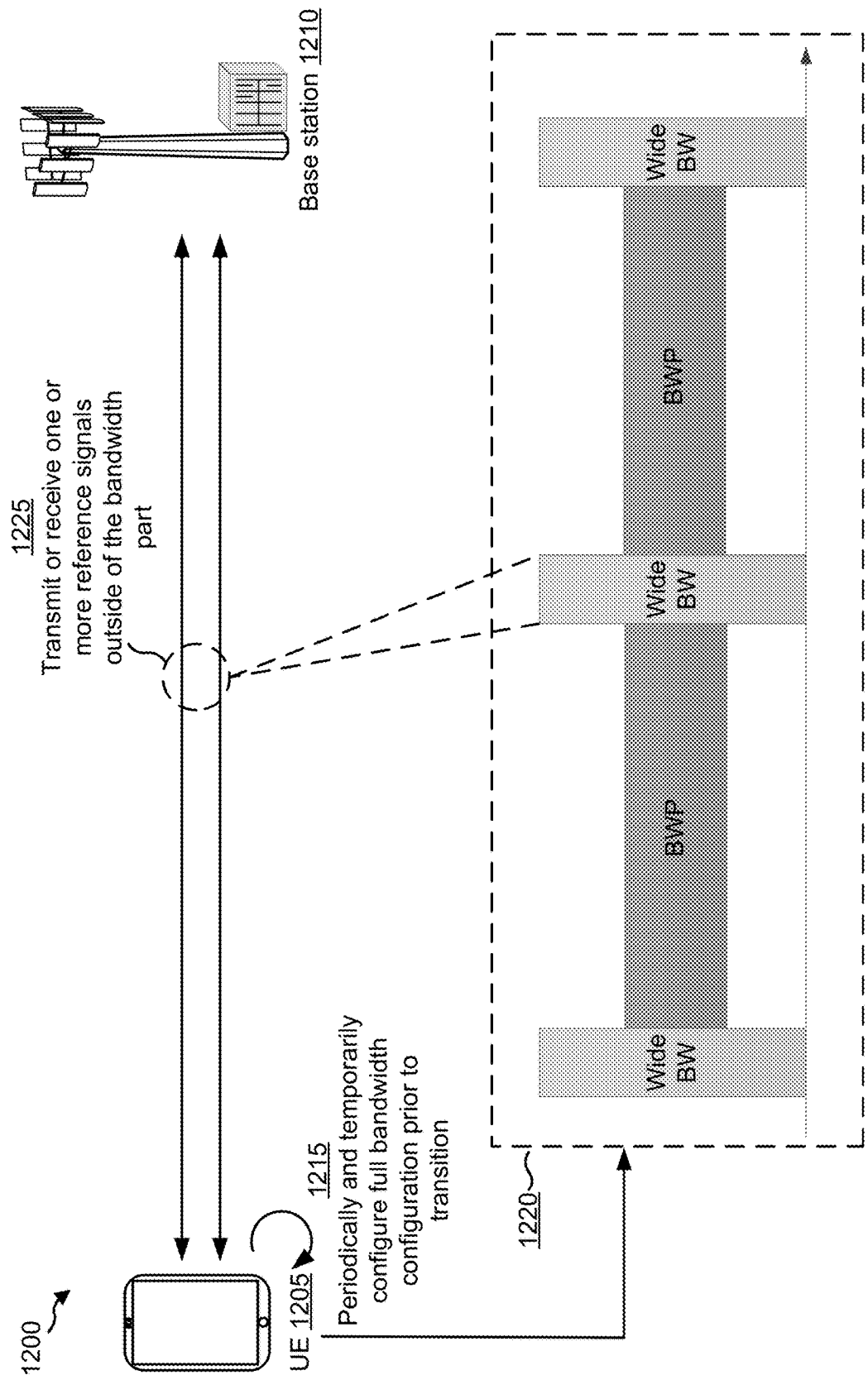

FIG. 12 is a diagram illustrating another example 1200 of bandwidth part management, in accordance with various aspects of the present disclosure. As shown in FIG. 12, a UE 1205 may communicate with a base station 1210. In some aspects, the UE 1205 may correspond to one or more UEs described elsewhere herein, such as UE 120, UE 905, UE 1005, UE 1105, and/or the like. Additionally, or alternatively, the base station 1210 may correspond to one or more base stations described elsewhere herein, such as the base station 110, base station 910, base station 1010, base station 1110, and/or the like.

As shown by reference number 1215, the UE 1205 may periodically and/or temporarily configure the full bandwidth configuration (e.g., on at least one CC used by the UE 1205)

prior to transitioning from the bandwidth part configuration to the full bandwidth configuration. For example, as shown by reference number 1220, the UE 1205 may periodically configure the full bandwidth configuration (shown as Wide BW) for a short time period, followed by the bandwidth part configuration (shown as BWP) for a long time period. The UE 1205 may switch back and forth between these configurations, as shown.

As shown by reference number 1225, the UE 1205 may transmit or receive one or more reference signals outside of the bandwidth part while temporarily configured with the full bandwidth configuration. For example, the UE 1205 may transmit or receive one or more reference signals on a frequency resource not included in the bandwidth part configuration, but which is included in a UE bandwidth capability (e.g., the full bandwidth configuration). The UE 1205 may use the one or more reference signals to quickly transition from the bandwidth part configuration to the full bandwidth configuration (e.g., to reduce latency of the transition) or as part of the process to transition from the bandwidth part configuration to the full bandwidth configuration (e.g., to reduce latency of the transition). For example, the reference signal(s) may be used to determine channel conditions of channels outside of the bandwidth part (but included in the full bandwidth), so that communications can be immediately and/or quickly scheduled for the UE 1205 after transitioning to the full bandwidth configuration.

The one or more reference signals may include, for example, a channel state information-reference signal (CSI-RS), a sounding reference signal (SRS), a tracking reference signal (TRS), and/or the like. In some aspects, while temporarily configured with the full bandwidth configuration or during transition to the full bandwidth configuration, the UE 1205 may receive a semi-static and/or dynamic indication of non-zero power (NZP) CSI-RS resources and/or interference measurement resources (IMR) from the base station 1210, may use such resource(s) to perform a CSI measurement, and may transmit CSI feedback to the base station. Additionally, or alternatively, the UE 1205 may transmit an SRS, which may include a configuration and/or an indication of the SRS. Additionally, or alternatively, the UE 1205 may receive an indication of whether TRS is present in the bandwidth outside of the bandwidth part. In this way, the UE 1205 may be able to be scheduled for data communications more quickly after transitioning to the full bandwidth configuration.

In some aspects, rather than or in addition to periodically activating the full bandwidth configuration for keep-alive management, a configuration (e.g., a frequency and/or time location, a number of antenna ports, a number of resource(s), and/or the like) of one or more reference signals may be indicated to the UE 1205 as part of the transition. For example, the base station 1210 may determine (e.g., autonomously and/or based in part on an indication from the UE 1205) that the UE 1205 is to transition to the full bandwidth configuration. Based at least in part on this determination, the base station 1210 may indicate, to the UE 1205, a configuration of CSI-RS (e.g., so that the UE 1205 can provide CSI feedback), a configuration of a TRS, a configuration for SRS, and/or the like. The configuration may include, for example, a time resource and/or a frequency resource for the one or more reference signals. Additionally, or alternatively, the base station 1210 may trigger the UE 1205 to transmit an SRS.

In some aspects, the base station 1210 may trigger the UE 1205 to transition to the full bandwidth configuration. In this case, the trigger may be an indication from the base station 1210 to the UE 1205, which may be included in an information field. Additionally, or alternatively, the trigger may be implicit via the indication of the configuration of one or more reference signals outside of the bandwidth part. In this way, the base station 1210 may conserve network resources.

As indicated above, FIG. 12 is provided as an example. Other examples are possible and may differ from what was described in connection with FIG. 12.

FIG. 13 is a diagram illustrating an example process 1300 performed, for example, by a UE, in accordance with various aspects of the present disclosure. Example process 1300 is an example where a UE (e.g., UE 120, UE 905, UE 1005, UE 1105, UE 1205, and/or the like) performs bandwidth part management.

As shown in FIG. 13, in some aspects, process 1300 may include determining a limit on a number of concurrently active bandwidth parts (block 1310). For example, the UE (e.g., using antenna 252, DEMOD 254, MIMO detector 256, receive processor 258, controller/processor 280, and/or the like) may determine a limit on a number of bandwidth parts permitted to be concurrently active, as described above in connection with FIGS. 9-12. In some aspects, the limit applies per component carrier used by the UE or across component carriers used by the UE.

As further shown in FIG. 13, in some aspects, process 1300 may include communicating using one or more bandwidth parts on one or more component carriers used by the UE based at least in part on the limit (block 1320). For example, the UE (e.g., using controller/processor 280 and/or the like) may configure one or more bandwidth parts on one or more component carriers used by the UE based at least in part on the limit on the number of concurrently active bandwidth parts, and may communicate using the one or more bandwidth parts, as described above in connection with FIGS. 9-12. In some aspects, at least one bandwidth part of the one or more bandwidth parts is less than a full bandwidth that the UE is capable of using.

Process 1300 may include additional aspects, such as any single aspect or any combination of aspects described below and/or in connection with one or more other processes described herein.

In some aspects, the limit is a single bandwidth part across all components carriers used by the UE. In some aspects, the limit includes a first number of bandwidth parts permitted to be concurrently active per component carrier used by the UE and a second number of bandwidth parts permitted to be concurrently active across component carriers used by the UE.

In some aspects, the one or more bandwidth parts are configured on a subset of slots or symbols. In some aspects, the one or more bandwidth parts are monitored on the subset of slots or symbols, and are not monitored on other slots or symbols. In some aspects, the one or more bandwidth parts are configured on the subset of slots or symbols based at least in part on a condition. In some aspects, the condition is based at least in part on: a number of component carriers configured to be used by the UE, a number of the one or more bandwidth parts configured by the UE, or some combination thereof. In some aspects, a search space to be monitored by the UE is restricted for the subset of slots or symbols.

In some aspects, the one or more bandwidth parts are configured for downlink communications. In some aspects, the one or more bandwidth parts are configured for uplink communications. In some aspects, the limit on the number of bandwidth parts is based at least in part on a number of uplink control channels configured for the UE.

In some aspects, the UE may determine one or more numerologies corresponding to the one or more bandwidth parts. In some aspects, one or more requested bandwidth part parameters are indicated to a base station. In some aspects, the one or more requested bandwidth part parameters include at least one of: a requested bandwidth for a bandwidth part of the one or more bandwidth parts, a requested number of bandwidth parts per component carrier or across component carriers, a requested numerology for a bandwidth part of the one or more bandwidth parts, or some combination thereof.

In some aspects, the one or more bandwidth parts are configured based at least in part on an indication from a base station, and the UE transmits an acknowledgement (ACK) or a negative acknowledgement (NACK) based at least in part on receiving the indication. In some aspects, wherein the indication is received via a downlink data channel, and the ACK is transmitted via a hybrid automatic repeat request (HARQ) response. In some aspects, the indication is not received via a downlink data channel, and the ACK is transmitted as an explicit response to the indication. In some aspects, the indication is at least one of an activation or a deactivation of at least one of the one or more bandwidth parts. In some aspects, when the indication is received via a downlink data channel, the ACK or the NACK is transmitted via a hybrid automatic repeat request (HARQ) response, or when the indication is not received via a downlink data channel, the ACK or the NACK is transmitted as an explicit response to the indication.

In some aspects, the one or more bandwidth parts are configured for at least one of downlink communications or uplink communications. In some aspects, the UE may receive an indication of one or more numerologies corresponding to the one or more bandwidth parts. In some aspects, the indication is received in at least one of: radio resource control (RRC) signaling, downlink control information (DCI), a media access control (MAC) control element (CE), a grant, or some combination thereof.

In some aspects, a bandwidth part, of the one or more bandwidth parts, is configured based at least in part on a numerology indicated for the bandwidth part. In some aspects, at least two different bandwidth parts, of the one or more bandwidth parts, are associated with different numerologies.

In some aspects, the UE may transition from a first bandwidth part configuration to a second bandwidth part configuration on one or more component carriers being used by the UE. In some aspects, one of the first bandwidth part configuration or the second bandwidth part configuration is a full bandwidth configuration. In some aspects, the second bandwidth part configuration is a full bandwidth configuration, and the transition is performed based at least in part on a rule, wherein the rule indicates at least one of: a component carrier, of a plurality of component carriers being used by the UE, that is to be transitioned to the full bandwidth configuration before any other component carriers of the plurality of component carriers, an order in which two or more of the plurality of component carriers are to be transitioned to the full bandwidth configuration, a group of component carriers, of the plurality of component carriers, that are to be transitioned to the full bandwidth configuration together, or some combination thereof.

In some aspects, the UE may determine a numerology corresponding to the second bandwidth part configuration, and may configure the second bandwidth part configuration based at least in part on the numerology. In some aspects, a numerology, corresponding to the second bandwidth part configuration, is signaled in association with scheduling on a data channel or a control channel. In some aspects, a first numerology corresponding to the first bandwidth part configuration is different from a second numerology corresponding to the second bandwidth part configuration. In some aspects, the second bandwidth part configuration is periodically or temporarily configured on at least one component carrier, of a plurality of component carriers being used by the UE, prior to transitioning from the first bandwidth part configuration to the second bandwidth part configuration on the one or more component carriers.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating another example process 1400 performed, for example, by a UE, in accordance with various aspects of the present disclosure. Example process 1400 is another example where a UE (e.g., UE 120, UE 905, UE 1005, UE 1105, UE 1205, and/or the like) performs bandwidth part management.

As shown in FIG. 14, in some aspects, process 1400 may include determining that the UE is to transition from a bandwidth part configuration to a full bandwidth configuration on one or more component carriers (block 1410). For example, the UE (e.g., using antenna 252, DEMOD 254, MIMO detector 256, receive processor 258, controller/processor 280, and/or the like) may determine that the UE is to transition from a bandwidth part configuration to a full bandwidth configuration on one or more component carriers of a plurality of component carriers used by the UE, as described above in connection with FIGS. 9-12.

As further shown in FIG. 14, in some aspects, process 1400 may include determining a rule relating to the transition (block 1420). For example, the UE (e.g., using antenna 252, DEMOD 254, MIMO detector 256, receive processor 258, controller/processor 280, and/or the like) may determine a rule relating to the transition, as described above in connection with FIGS. 9-12.

As further shown in FIG. 14, in some aspects, process 1400 may include transitioning from the bandwidth part configuration to the full bandwidth configuration on the one or more component carriers based at least in part on the rule (block 1430). For example, the UE (e.g., using antenna 252, DEMOD 254, MIMO detector 256, receive processor 258, controller/processor 280, transmit processor 264, TX MIMO processor 266, MOD 254, and/or the like) may transition from the bandwidth part configuration to the full bandwidth configuration on the one or more component carriers based at least in part on the rule, as described above in connection with FIGS. 9-12.

Process 1400 may include additional aspects, such as any single aspect or any combination of aspects described below and/or in connection with one or more other processes described herein.

In some aspects, the rule indicates at least one of: a component carrier, of the plurality of component carriers, that is to be transitioned to the full bandwidth configuration before any other component carriers of the plurality of component carriers; an order in which two or more of the plurality of component carriers are to be transitioned to the full bandwidth configuration; a group of component carriers, of the plurality of component carriers, that are to be transitioned to the full bandwidth configuration together; or some combination thereof.

In some aspects, the UE may determine a numerology corresponding to the full bandwidth configuration. In some aspects, a numerology, corresponding to the full bandwidth configuration, is signaled in association with scheduling on a data channel or a control channel. In some aspects, a first numerology corresponding to the full bandwidth configuration is different from a second numerology corresponding to the bandwidth part configuration.

In some aspects, the full bandwidth configuration is periodically or temporarily configured on at least one component carrier, of the plurality of component carriers, prior to transitioning from the bandwidth part configuration to the full bandwidth configuration on the one or more component carriers. In some aspects, one or more reference signals are received or transmitted, on a frequency resource not included in the bandwidth part configuration, while temporarily configured for the full bandwidth configuration on the at least one component carrier. In some aspects, the one or more reference signals include at least one of: a channel state information-reference signal, a sounding reference signal, a tracking reference signal, or some combination thereof. In some aspects, the transition from the bandwidth part configuration to the full bandwidth configuration is based at least in part on the one or more reference signals. In some aspects, a configuration of one or more reference signals, on a frequency resource not included in the bandwidth part configuration, is indicated to the UE as part of the transition.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining, by a user equipment (UE), a limit on a number of concurrently active bandwidth parts, wherein the limit applies per component carrier used by the UE; and
   communicating, by the UE, using one or more bandwidth parts on one or more component carriers used by the UE based at least in part on the limit, wherein at least one bandwidth part of the one or more bandwidth parts is less than a full bandwidth that the UE is capable of using.

2. The method of claim 1, wherein the limit is a single bandwidth part.

3. The method of claim 1, wherein the limit includes a first number of bandwidth parts permitted to be concurrently active per component carrier used by the UE and a second number of bandwidth parts permitted to be concurrently active across component carriers used by the UE.

4. The method of claim 1, wherein the one or more bandwidth parts are configured on a subset of slots or symbols.

5. The method of claim 4, wherein the one or more bandwidth parts are monitored on the subset of slots or symbols, and are not monitored on other slots or symbols.

6. The method of claim 4, wherein a search space to be monitored by the UE is restricted for the subset of slots or symbols.

7. The method of claim 1, wherein the one or more bandwidth parts are configured for at least one of downlink communications or uplink communications.

8. The method of claim 1, further comprising receiving an indication of one or more numerologies corresponding to the one or more bandwidth parts.

9. The method of claim 8, wherein the indication is received in at least one of:
   radio resource control (RRC) signaling,
   downlink control information (DCI),
   a media access control (MAC) control element (CE),
   a grant, or
   some combination thereof.

10. The method of claim 1, wherein a bandwidth part, of the one or more bandwidth parts, is configured based at least in part on a numerology indicated for the bandwidth part.

11. The method of claim 1, wherein at least two different bandwidth parts, of the one or more bandwidth parts, are associated with different numerologies.

12. The method of claim 1, wherein one or more requested bandwidth part parameters are indicated to a base station.

13. The method of claim 12, wherein the one or more requested bandwidth part parameters include at least one of:
a requested bandwidth for a bandwidth part of the one or more bandwidth parts,
a requested number of bandwidth parts per component carrier or across component carriers,
a requested numerology for a bandwidth part of the one or more bandwidth parts, or
some combination thereof.

14. The method of claim 1, wherein the one or more bandwidth parts are configured based at least in part on an indication from a base station, and the UE transmits an acknowledgement (ACK) or a negative acknowledgement (NACK) based at least in part on receiving the indication.

15. The method of claim 14, wherein:
when the indication is received via a downlink data channel, the ACK or the NACK is transmitted via a hybrid automatic repeat request (HARQ) response, or
when the indication is not received via a downlink data channel, the ACK or the NACK is transmitted as an explicit response to the indication.

16. The method of claim 14, wherein the indication is at least one of an activation or a deactivation of at least one of the one or more bandwidth parts.

17. The method of claim 1, further comprising transitioning from a first bandwidth part configuration to a second bandwidth part configuration on one or more component carriers being used by the UE.

18. The method of claim 17, wherein one of the first bandwidth part configuration or the second bandwidth part configuration is a full bandwidth configuration.

19. The method of claim 17, wherein the second bandwidth part configuration is a full bandwidth configuration, and wherein the transition is performed based at least in part on a rule, wherein the rule indicates at least one of:
a component carrier, of a plurality of component carriers being used by the UE, that is to be transitioned to the full bandwidth configuration before any other component carriers of the plurality of component carriers,
an order in which two or more of the plurality of component carriers are to be transitioned to the full bandwidth configuration,
a group of component carriers, of the plurality of component carriers, that are to be transitioned to the full bandwidth configuration together, or
some combination thereof.

20. The method of claim 17, further comprising determining a numerology corresponding to the second bandwidth part configuration and configuring the second bandwidth part configuration based at least in part on the numerology.

21. The method of claim 17, wherein a numerology, corresponding to the second bandwidth part configuration, is signaled in association with scheduling on a data channel or a control channel.

22. The method of claim 17, wherein a first numerology corresponding to the first bandwidth part configuration is different from a second numerology corresponding to the second bandwidth part configuration.

23. The method of claim 17, wherein the second bandwidth part configuration is periodically or temporarily configured on at least one component carrier, of a plurality of component carriers being used by the UE, prior to transitioning from the first bandwidth part configuration to the second bandwidth part configuration on the one or more component carriers.

24. A user equipment (UE) for wireless communication, comprising:
a memory; and
one or more processors operatively coupled to the memory, the memory and the one or more processors configured to:
determine a limit on a number of concurrently active bandwidth parts, wherein the limit applies per component carrier used by the UE; and
communicate using one or more bandwidth parts on one or more component carriers used by the UE based at least in part on the limit, wherein at least one bandwidth part of the one or more bandwidth parts is less than a full bandwidth that the UE is capable of using.

25. The UE of claim 24, wherein the limit is a single bandwidth part.

26. The UE of claim 24, wherein the limit includes a first number of bandwidth parts permitted to be concurrently active per component carrier used by the UE and a second number of bandwidth parts permitted to be concurrently active across component carriers used by the UE.

27. The UE of claim 24, wherein the one or more bandwidth parts are configured on a subset of slots or symbols.

28. The UE of claim 27, wherein the one or more bandwidth parts are monitored on the subset of slots or symbols, and are not monitored on other slots or symbols.

29. The UE of claim 27, wherein a search space to be monitored by the UE is restricted for the subset of slots or symbols.

30. The UE of claim 24, wherein the one or more bandwidth parts are configured for at least one of downlink communications or uplink communications.

31. The UE of claim 24, wherein the UE is configured to receive an indication of one or more numerologies corresponding to the one or more bandwidth parts.

32. The UE of claim 31, wherein the indication is received in at least one of:
radio resource control (RRC) signaling,
downlink control information (DCI),
a media access control (MAC) control element (CE),
a grant, or
some combination thereof.

33. The UE of claim 24, wherein a bandwidth part, of the one or more bandwidth parts, is configured based at least in part on a numerology indicated for the bandwidth part.

34. The UE of claim 24, wherein at least two different bandwidth parts, of the one or more bandwidth parts, are associated with different numerologies.

35. The UE of claim 24, wherein one or more requested bandwidth part parameters are indicated to a base station.

36. The UE of claim 35, wherein the one or more requested bandwidth part parameters include at least one of:
a requested bandwidth for a bandwidth part of the one or more bandwidth parts,
a requested number of bandwidth parts per component carrier or across component carriers,
a requested numerology for a bandwidth part of the one or more bandwidth parts, or
some combination thereof.

37. The UE of claim 24, wherein the one or more bandwidth parts are configured based at least in part on an indication from a base station, and the UE transmits an acknowledgement (ACK) or a negative acknowledgement (NACK) based at least in part on receiving the indication.

38. The UE of claim 37, wherein:
when the indication is received via a downlink data channel, the ACK or the NACK is transmitted via a hybrid automatic repeat request (HARQ) response, or
when the indication is not received via a downlink data channel, the ACK or the NACK is transmitted as an explicit response to the indication.

39. The UE of claim 37, wherein the indication is at least one of an activation or a deactivation of at least one of the one or more bandwidth parts.

40. The UE of claim 24, wherein the UE is configured to transition from a first bandwidth part configuration to a second bandwidth part configuration on one or more component carriers being used by the UE.

41. The UE of claim 40, wherein one of the first bandwidth part configuration or the second bandwidth part configuration is a full bandwidth configuration.

42. The UE of claim 40, wherein the second bandwidth part configuration is a full bandwidth configuration, and wherein the transition is performed based at least in part on a rule, wherein the rule indicates at least one of:
a component carrier, of a plurality of component carriers being used by the UE, that is to be transitioned to the full bandwidth configuration before any other component carriers of the plurality of component carriers,
an order in which two or more of the plurality of component carriers are to be transitioned to the full bandwidth configuration,
a group of component carriers, of the plurality of component carriers, that are to be transitioned to the full bandwidth configuration together, or
some combination thereof.

43. The UE of claim 40, wherein the UE is configured to determine a numerology corresponding to the second bandwidth part configuration and configure the second bandwidth part configuration based at least in part on the numerology.

44. The UE of claim 40, wherein a numerology, corresponding to the second bandwidth part configuration, is signaled in association with scheduling on a data channel or a control channel.

45. The UE of claim 40, wherein a first numerology corresponding to the first bandwidth part configuration is different from a second numerology corresponding to the second bandwidth part configuration.

46. The UE of claim 40, wherein the second bandwidth part configuration is periodically or temporarily configured on at least one component carrier, of a plurality of component carriers being used by the UE, prior to transitioning from the first bandwidth part configuration to the second bandwidth part configuration on the one or more component carriers.

47. A non-transitory computer-readable medium storing instructions for wireless communication, the instructions comprising:
one or more instructions that, when executed by one or more processors of a user equipment (UE), cause the one or more processors to:
determine a limit on a number of concurrently active bandwidth parts, wherein the limit applies per component carrier used by the UE; and
communicate using one or more bandwidth parts on one or more component carriers used by the UE based at least in part on the limit, wherein at least one bandwidth part of the one or more bandwidth parts is less than a full bandwidth that the UE is capable of using.

48. The non-transitory computer-readable medium of claim 47, wherein at least two different bandwidth parts, of the one or more bandwidth parts, are associated with different numerologies.

49. An apparatus for wireless communication, comprising:
means for determining a limit on a number of concurrently active bandwidth parts, wherein the limit applies per component carrier used by the apparatus; and
means for communicating using one or more bandwidth parts on one or more component carriers used by the apparatus based at least in part on the limit, wherein at least one bandwidth part of the one or more bandwidth parts is less than a full bandwidth that the apparatus is capable of using.

50. The apparatus of claim 49, wherein at least two different bandwidth parts, of the one or more bandwidth parts, are associated with different numerologies.

* * * * *